United States Patent
Araki

(10) Patent No.: US 12,019,603 B2
(45) Date of Patent: Jun. 25, 2024

(54) AREA ALLOCATION DEVICE, AREA ALLOCATION METHOD, AND NON-VOLATILE RECORDING MEDIUM

(71) Applicant: NEC Corporation, Tokyo (JP)

(72) Inventor: Takuya Araki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 664 days.

(21) Appl. No.: 16/338,741

(22) PCT Filed: Oct. 10, 2017

(86) PCT No.: PCT/JP2017/036661
§ 371 (c)(1),
(2) Date: Apr. 2, 2019

(87) PCT Pub. No.: WO2018/070376
PCT Pub. Date: Apr. 19, 2018

(65) Prior Publication Data
US 2021/0286789 A1 Sep. 16, 2021

(30) Foreign Application Priority Data
Oct. 11, 2016 (JP) .................. 2016-199710

(51) Int. Cl.
*G06F 16/00* (2019.01)
*G06F 12/02* (2006.01)
(Continued)

(52) U.S. Cl.
CPC ...... *G06F 16/2237* (2019.01); *G06F 12/0207* (2013.01); *G06F 16/2264* (2019.01); *G06N 20/00* (2019.01)

(58) Field of Classification Search
CPC ............ G06F 16/2237; G06F 12/0207; G06F 16/2264; G06F 17/16; G06N 20/00
See application file for complete search history.

(56) References Cited

U.S. PATENT DOCUMENTS

2007/0198621 A1* 8/2007 Lumsdaine ............ G06F 17/16
708/200
2011/0307685 A1* 12/2011 Song ...................... G06F 17/10
712/16
(Continued)

FOREIGN PATENT DOCUMENTS

| JP | 2006139663 A | 6/2006 |
| JP | 2014002484 A | 1/2014 |

(Continued)

OTHER PUBLICATIONS

Japanese Office Action for JP Application No. 2018-545002 dated Feb. 2, 2021 with English Translation.
(Continued)

*Primary Examiner* — Diedra McQuitery

(57) ABSTRACT

Provided are an area allocation device and the like that can efficiently allocate memory volume for processing of matrix operations. The area allocation device specifies array identifiers representing positions of elements storing a value different from a predetermined value in each array of subarray information in array information, arrays consisting of a plurality of element, the array information including a plurality of information representing the arrays, the subarray information corresponding to at least a part of the arrays; calculates a number of the specified array identifiers; and allocates a memory area having a memory volume depending the calculated number.

9 Claims, 22 Drawing Sheets

(51) Int. Cl.
*G06F 16/22* (2019.01)
*G06N 20/00* (2019.01)

(56) References Cited

U.S. PATENT DOCUMENTS

| | | | |
|---|---|---|---|
| 2014/0298351 A1* | 10/2014 | Usui | G06F 17/16 718/107 |
| 2015/0067009 A1* | 3/2015 | Strauss | G06F 17/16 708/203 |
| 2015/0113031 A1* | 4/2015 | Reinwald | G06F 12/0223 708/520 |
| 2015/0242484 A1* | 8/2015 | Zhao | G06F 16/22 707/755 |
| 2016/0140084 A1* | 5/2016 | Daga | G06F 17/16 708/207 |
| 2017/0017886 A1* | 1/2017 | Gao | G06Q 30/0241 |
| 2017/0262766 A1* | 9/2017 | Chao | G06N 20/00 |
| 2017/0286365 A1* | 10/2017 | Golovashkin | G06F 17/16 |
| 2018/0293789 A1* | 10/2018 | Shen | E21B 43/26 |

FOREIGN PATENT DOCUMENTS

| | | |
|---|---|---|
| JP | 2014199545 A | 10/2014 |
| JP | 2014228984 A | 12/2014 |

OTHER PUBLICATIONS

International Search Report, dated Nov. 28, 2017 from the International Bureau in counterpart International application No. PCT/JP2017/036661.
Written Opinion, dated Nov. 28, 2017 from the International Bureau in counterpart International application No. PCT/JP2017/036661.
Agarwal, A. et al., "A Reliable Effective Terascale Linear Learning System", Journal of Machine Learning Research, vol. 15, 2014, pp. 1111-1133 (23 pages).

* cited by examiner

Fig.5
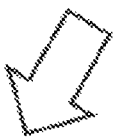
Fig.6
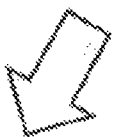
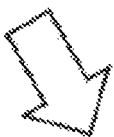

Fig.7

| MINI-BATCH IDENTIFIER | ROW IDENTIFIER | SUBMATRIX INFORMATION ||||
|---|---|---|---|---|---|
| | | COLUMN IDENTIFIER ||||
| | | 1 | 2 | 3 | 4 |
| B1 | 1 | 1 | | | |
| | 2 | | | 1 | |
| B2 | 3 | | 1 | | |
| | 4 | | | | 1 |
| B3 | 5 | | | | |
| | 6 | 1 | | | 1 |

Fig.25

|  |  | SITE NAME | | | |
|---|---|---|---|---|---|
|  |  | SA | SB | SC | SD |
| ADVERTISEMENT NAME | F1 | 1 |  |  |  |
|  | F2 |  |  | 1 |  |
|  | F3 |  | 1 |  |  |
|  | F4 |  |  |  | 1 |

AREA ALLOCATION DEVICE, AREA ALLOCATION METHOD, AND NON-VOLATILE RECORDING MEDIUM

This application is a National Stage Entry of PCT/JP2017/036661 filed on Oct. 10, 2017, which claims priority from Japanese Patent Application 2016-199710 filed on Oct. 11, 2016, the contents of all of which are incorporated herein by reference, in their entirety.

Technical Field

The present invention relates to an area allocation devices and the like that allocates memory area necessary for matrix operation processing.

BACKGROUND ART

Machine learning using large-scale data to be a target becomes popular in big data analysis. For example, NPL 1 describes an example of a method of performing large-scale machine learning in parallel.

Each processing device according to a parallel processing method described in NPL 1 gathers operation results obtained by independent processing by using a function called "All Reduce" (a method in which operation processing is executed while referring to data stored in another processing device, and each processing device calculates a same operation result).

The "All Reduce" function is a function of adding pieces of data of all processing devices within a certain group, and sharing the addition result among all the processing devices within the certain group, for example.

PTL 1 discloses a recommendation system for recommending an item in a service to a service user. The recommendation system selects an item to be recommended to a service user from among items in the service, based on a history on evaluation performed by a user who uses the item in the service, with respect to the item.

PTL 2 discloses a vector processing unit for executing an operation on two vectors. The vector processing unit converts one of the two vectors into a first vector having a data structure in accordance with a sparse vector format, and converts the other vector into a second vector having a data structure in accordance with a dense vector format. The vector processing unit executes operation processing to the first vector and the second vector. Herein, the sparse vector format is a data format for storing only an element being a non-zero value. The dense vector format is a data format for storing all elements.

CITATION LIST

Patent Literature

PTL 1: Japanese Unexamined Patent Application Publication No. 2014-228984
PTL 2: Japanese Unexamined Patent Application Publication No. 2014-002484

Non-Patent Literature

NPT 1: Alekh Agarwal, et al. A Reliable Effective Terascale Linear Learning System, Journal of Machine Learning Research 15 (2014) PP. 1111-1133

SUMMARY OF INVENTION

Technical Problem

However, even when any one of the devices disclosed in PTL 1 or PTL 2 is used, it is not possible to efficiently secure a memory volume required for processing relating to a matrix. A reason for this is that, even when following the methods disclosed in PTLs 1 and 2, it is not necessarily possible to efficiently execute parallel processing with respect to matrix information that appears in processing in machine learning. A detailed reason will be described later in an example embodiment with reference to FIG. 25.

In view of the above, one of objects of the present invention is to provide an area allocation device and the like which enable to efficiently secure a memory area required for processing to matrix information in terms of a memory volume.

Solution to Problem

As an aspect of the present invention, an area allocation device including:
  array specification means for specifying array identifiers of target arrays from second arrays included in subarray information for array information, the array information including elements arranged in two dimensions by rows and columns, first arrays representing one of the rows and the columns, the second arrays representing another of the rows and the columns, the target arrays including at least an element taking a value different from a predetermined value, the element being included in the second arrays, the subarray information including information in at least a part of the first arrays; and
  area allocation means for calculating a number of the array identifiers specified by the array specification means and allocating a memory area having a memory volume depending the calculated number.

In addition, as another aspect of the present invention, an area allocation method including:
  specifying array identifiers of target arrays from second arrays included in subarray information for array information, the array information including elements arranged in two dimensions by rows and columns, first arrays representing one of the rows and the columns, the second arrays representing another of the rows and the columns, the target arrays including at least an element taking a value different from a predetermined value, the element being included in the second arrays, the subarray information including information in at least a part of the first arrays;
  calculating a number of the specified array identifiers; and
  allocating a memory area having a memory volume depending the calculated number.

In addition, as another aspect of the present invention, an area allocation program making a computer achieve:
  an array specification function for specifying array identifiers of target arrays from second arrays included in subarray information for array information, the array information including elements arranged in two dimensions by rows and columns, first arrays representing one of the rows and the columns, the second arrays representing another of the rows and the columns, the target arrays including at least an element taking a value different from a predetermined value, the element being included in the second arrays, the subarray information including information in at least a part of the first arrays; and an area allocation function for calculating a number of the specified array identifiers and allocating a memory area having a memory volume depending the calculated number.

Furthermore, the object is also achieved by a computer-readable recording medium that records the program.

Advantageous Effects of Invention

An area allocation device and the like according to the present invention are able to efficiently secure a memory area required for processing to matrix information in terms of a memory volume.

BRIEF DESCRIPTION OF DRAWINGS

FIG. 5 is a diagram conceptually illustrating processing in a gather unit.

FIG. 6 is a diagram conceptually illustrating processing in a model conversion unit.

FIG. 7 is a diagram conceptually illustrating submatrix information to be processed in terms of a mini-batch unit.

FIG. 25 is a diagram conceptually illustrating one example of training information.

EXAMPLE EMBODIMENT

Figure 1:
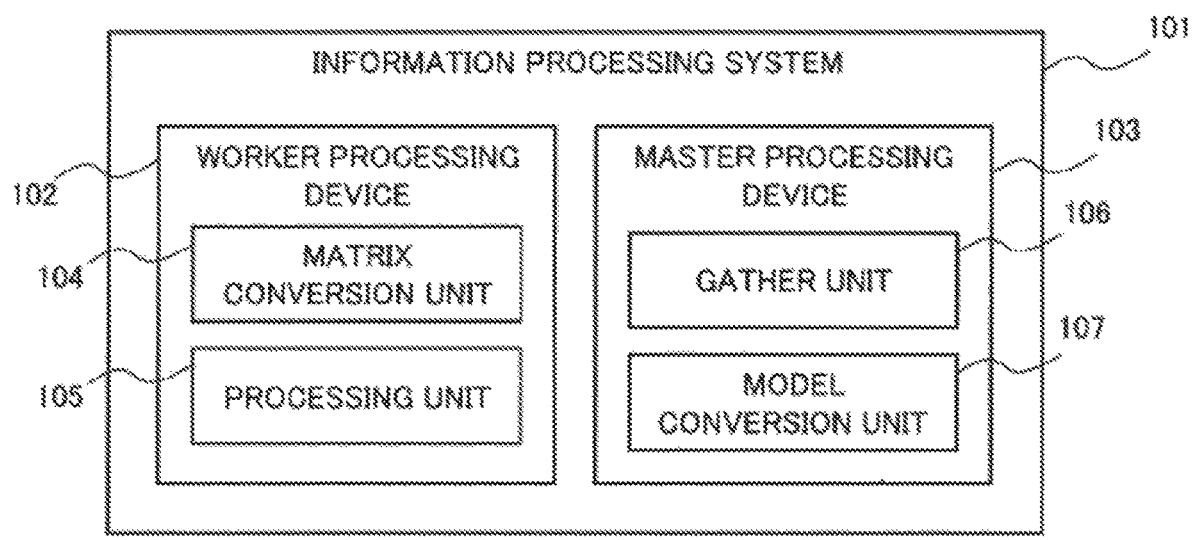
FIG. 1 is a block diagram illustrating a configuration of an information processing system according to a first example embodiment of the present invention.

First, an issue to be solved by the present invention will be described in detail for facilitating understanding of the invention of the present application.

Training information being a target to be learned in machine learning is generally large-scale information, and is represented by using matrix information. One example of training information being a learning target in machine learning will be described with reference to FIG. 25. FIG. 25 is a diagram conceptually illustrating one example of training information.

Training information is information representing whether a user of a certain site has clicked an advertisement displayed in the certain site, for example. In training information exemplified in FIG. 25, a site name is indicated in a column direction, and an advertisement name is indicated in a row direction. When a site represented by a site name displays an advertisement represented by an advertisement name, and a user has clicked the advertisement in the site, in training information, a value (e.g., 1), which is different from a predetermined value (e.g., 0 (zero) or a null value), is set as a value of an element to be determined by a column representing the site name and a row representing the advertisement name. Further, when the advertisement has never been clicked in the site by a user, in training information, a predetermined value (e.g., 0 (zero) or a null value) is set as a value of an element to be determined by a column representing the site name and a row representing the advertisement name. In FIG. 25, a predetermined value is illustrated by using a null value. Further, training information exemplified in FIG. 25 is generated in accordance with a method also called "One Hot Encoding", for example.

Hereinafter, for convenience of following explanation, it is assumed that a predetermined value is 0 (zero) and a value different from the predetermined value is 1. However, these values are not limited to 0 and 1. Further, an element storing a predetermined value is referred to as a "zero element". An element storing a value different from the predetermined value is referred to as a "non-zero element".

When training information is generated in accordance with "One Hot Encoding", the training information is also referred to as a sparse matrix, since a number of elements having a value "1" is extremely smaller than a number of elements having a value "0". When optimizing model information as a basis for calculating a click-through rate, for example, values of parameters constituting model information are optimized based on training information exemplified in FIG. 25, in accordance with a predetermined calculation procedure such as a logistic regression method.

Optimized model information can be represented by using a numerical array (vector) including values of parameters constituting the model information. In this case, the vector may be represented as a dense vector (or a dense matrix) in which all values of the parameter constituting the model information are stored. A number of elements included in the vector is determined depending on a number of non-zero elements included in training information, for example. Model information to be generated based on training information is represented by using a vector including elements by a number of columns included in training information, for example. Therefore, as a number of columns included in training information increases, a number of elements in model information to be generated based on the training information increases.

When a predetermined calculation procedure is processed in parallel in an information processing system including a plurality of information processing devices, as exemplified in FIG. 3 (described later in a first example embodiment), training information (matrix information) is decomposed, and a piece of decomposed training information (submatrix information in FIG. 3) is allocated to (arranged at) each information processing device.

Hereinafter, for convenience of explanation, an information processing device is simply referred to as a "processing device".

Each processing device generates model information (for convenience of explanation, referred to as "submodel information" (exemplified in FIG. 5)) relating to the piece of decomposed training information, by using the piece of decomposed training information, in accordance with a predetermined calculation procedure. In processing of generating model information, each processing device generates model information (for convenience of explanation, referred to as "whole model information" (exemplified in FIG. 5)), which is optimized regarding whole training information, based on values of parameters constituting generated model information (specifically, values of parameters distributed in each processing device) by using an "All Reduce" function. Consequently, model information that is optimized regarding whole training information is stored in each processing device. In this case, each processing device mutually communicates values of parameters constituting the model information, in processing in accordance with an "All Reduce" function. Therefore, since a number of parameters constituting model information increases, as a number of columns included in training information increases, a communication time in an "All Reduce" function increases.

The inventor of the present application found an issue that even when a parallel processing method used in a numerical simulation and the like is applied to processing in accordance with a processing procedure as described above, it is not necessarily possible to execute high-efficient parallel processing. This issue will be described.

For example, in a numerical simulation, a non-zero element included in a matrix represents that information allocated to a column associated with a vertical direction where the non-zero element is located, and information allocated to a row associated with a horizontal direction where the non-zero element is located, are associated with each other. For example, information allocated to an I-th row (where I is a natural number) and information allocated to an I-th column represent pieces of information relating to same parameters. Therefore, in a numerical simulation, when a row of the matrix is reordered, it is necessary to appropriately reorder a column, in order to maintain consistency of information allocated to a row and a column.

When processing for a matrix (e.g., a matrix vector product of a matrix and an array (vector)) is processed in parallel, for example, a processing device for executing processing for each row is determined in advance. In this case, each processing device executes operation processing to a row allocated to the processing device itself. Each processing device is required to secure a memory area for storing a matrix in the processing device itself, based on a number of non-zero columns included in the original matrix (specifically, a whole matrix). Therefore, a memory volume in each processing device is determined depending on a number of non-zero columns included in an original matrix.

On the other hand, a non-zero element included in a matrix that appears in learning processing as described above is not associated with information allocated to a column associated with a vertical direction where the non-zero element is located, and information allocated to a row associated with a horizontal direction where the non-zero element is located. For example, as exemplified in FIG. 25, information allocated to an I-th row (where I is a natural number), and information allocated to an I-th column are generally different. Therefore, even when a row in a matrix that appears in learning processing is reordered, it is not necessary to reorder a column, in order to maintain consistency of information allocated to a row and a column. Likewise, even when a column in the matrix is reordered, it is not necessary to reorder a row. Consequently, it is possible to determine a memory volume, not based on a number of non-zero columns included in an original matrix, but based on a number of non-zero columns included in a matrix (submatrix) allocated to each processing device.

When a parallel processing method used in a numerical simulation is applied to learning processing, many communications are required in processing of calculating values of elements (e.g., parameters constituting model information). The inventor of the present application found an issue as described above, based on such investigation, and derived a means for solving the issue. Hereinafter, example embodiments for implementing the present invention capable of solving such an issue will be described with reference to the drawings.

First Example Embodiment

A configuration of an information processing system 101 according to a first example embodiment of the present invention will be described in detail with reference to FIG. 1. FIG. 1 is a block diagram illustrating a configuration of the information processing system 101 according to the first example embodiment of the present invention.

The information processing system 101 according to the first example embodiment includes a worker processing device 102 and a master processing device 103. The worker processing device 102 includes a matrix conversion unit (matrix converter) 104 and a processing unit (processor) 105. The master processing device 103 includes a gather unit (gatherer) 106 and a model conversion unit (model converter) 107. In the information processing system 101, a number of the master processing devices 103 is, for example, one, and a number of the worker processing devices 102 is, for example, at least one. The master processing device 103 may have a function included in the worker processing device 102.

The matrix conversion unit 104 inputs submatrix information (described later with reference to FIG. 3), for example, and generates conversion information (described later with reference to FIG. 4) and compressed matrix information (described later with reference to FIG. 4) by converting the input information. The matrix conversion unit 104 transmits generated conversion information to the master processing device 103, and further outputs generated compressed matrix information to the processing unit 105.

The processing unit 105 inputs compressed matrix information generated by the matrix conversion unit 104, and model information (hereinafter, referred to as "input model information") as will be described later in this paragraph. The processing unit 105 generates a processing result model (hereinafter, referred to as "output model information" (e.g., submodel information in FIG. 5)) by executing processing in accordance with a predetermined calculation procedure, with respect to the input compressed matrix information (exemplified in FIG. 4) and model information. The processing unit 105 transmits generated output model information to the master processing device 103. Output model information is model information representing a relevance between a value included in a row in compressed matrix information (or matrix information), and a value being a prediction target. Input model information is information as a basis for which the output model information is calculated. Output model information is generated by determining values of parameters included in input model information, for example, in accordance with a predetermined calculation procedure (e.g., a least square method or a logistic regression method). However, a predetermined calculation procedure is not limited to the above-described methods. In summary, model information is information representing a relevance between input and a value being a prediction target, by using parameters. The processing unit 105 generates output model information (e.g., submodel information in FIG. 5) by determining values of parameters included in input model information, in accordance with a predetermined calculation procedure, based on input compressed matrix information.

When a predetermined calculation procedure is a procedure of calculating a linear regression model, submodel information represents, for example, a partial calculation result in submatrix information in the procedure for calculating a coefficient of each parameter. For example, when a value of the parameter is calculated by a sum of a plurality of elements included in matrix information (exemplified in FIG. 3), a parameter in submodel information represents a sum of elements included in submatrix information (exemplified in FIG. 3).

Figure 3:
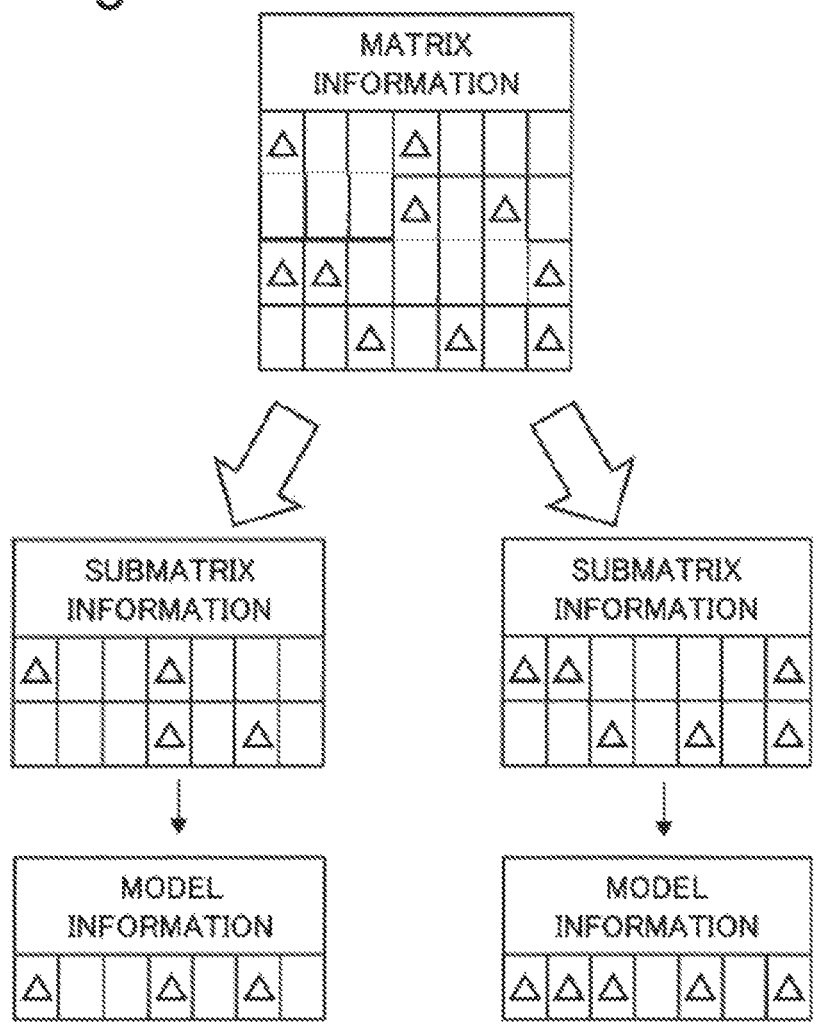
FIG. 3 is a diagram conceptually illustrating one example of matrix information.

In the master processing device 103, the gather unit 106 receives conversion information transmitted by the worker processing device 102 and submodel information, gathers the received submodel information in accordance with the conversion information, and thereby, generates whole model information (exemplified in FIG. 5) for matrix information (exemplified in FIG. 3). In this case, in whole model information (exemplified in FIG. 5), parameters included in model information are optimized in accordance with a predetermined calculation procedure, based on matrix information (exemplified in FIG. 3).

Next, matrix information being one example of training information will be described with reference to FIG. 3. FIG. 3 is a diagram conceptually illustrating one example of matrix information. Matrix information is training information as described with reference to FIG. 25, for example. In the example illustrated in FIG. 3, "A" represents a value (e.g., a numerical value other than zero), which is different from a predetermined value. A null value in matrix information represents the predetermined value (e.g., zero). In FIG. 3, for aiding understanding, matrix information and submatrix information are displayed for all values. However, as will be described with reference to FIG. 4 and the like, it is not necessarily required that a predetermined value is stored in the matrix information.

For convenience of explanation, in matrix information being a target to be processed in the information processing system 101, it is assumed that information allocated to each row represents training information (exemplified in FIG. 25) relating to one instance. In the matrix information, it is assumed that information allocated to each column represents values of parameters (specifically, parameters constituting model information) representing a feature of the instance. Matrix information is not limited to the above-described example. For example, information allocated to each column may represent training information (exemplified in FIG. 25) relating to one instance. In the matrix information, information allocated to each row may represent values of parameters (specifically, parameters constituting model information) representing a feature of the instance.

Figure 2:
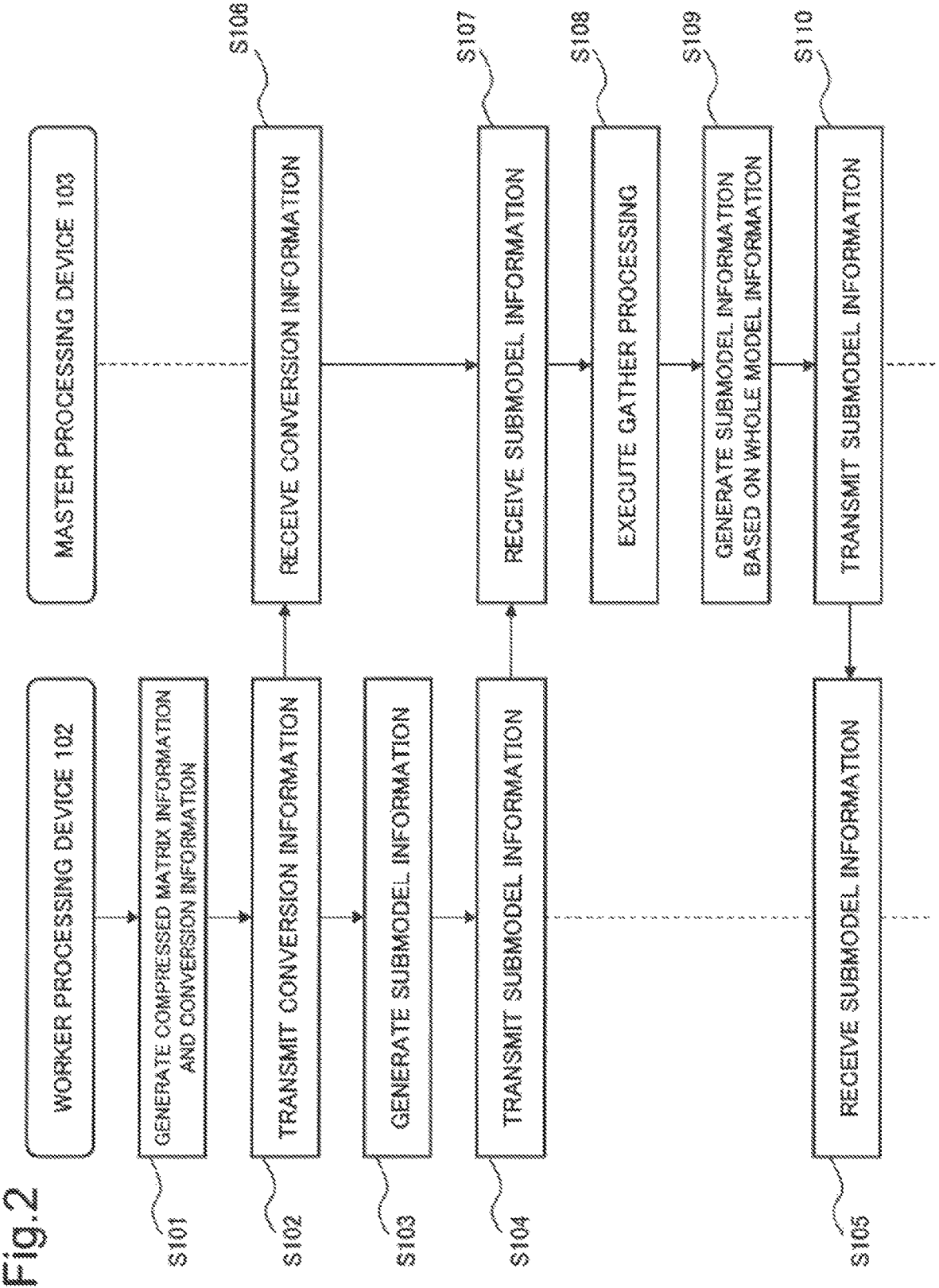
FIG. 2 is a sequence diagram illustrating a flow of processing in the information processing system according to the first example embodiment.

Matrix information (exemplified in FIG. 3) is decomposed in a horizontal (row) direction, and processing, as will be described later with reference to FIG. 2, is executed with respect to a piece of decomposed matrix information (e.g., submatrix information in FIG. 3). Herein, each piece of matrix information decomposed in a horizontal (row) direction is referred to as "submatrix information". When a predetermined calculation procedure is processed in parallel, for example, processing is allocated to each processing device for the each piece of submatrix information. For example, in the example illustrated in FIG. 3, matrix information is decomposed into submatrix information (left side in FIG. 3) storing values of elements in first and second rows in the matrix information, and submatrix information (right side in FIG. 3) storing values of elements in third and fourth rows in the matrix information.

When model information (submodel information exemplified in FIG. 5) to submatrix information is generated in accordance with a predetermined processing procedure, values of parameters constituting model information to be generated are determined, based on values included in a column in the submatrix information (exemplified in FIG. 3). For example, as exemplified in model information in FIG. 3, when the column includes at least one non-zero element, possibility that a value of a parameter to the column is non-zero is high. However, when the column does not include a non-zero element, a value of a parameter to the column is zero.

In the following description, it is assumed that a column including at least one element taking a value different from a predetermined value (zero, a null value, or the like) is referred to as a "target column". In particular, when the predetermined value is zero, it is assumed that a column including at least one element taking a value different from zero (specifically, non-zero) is referred to as a "non-zero column". Therefore, a non-zero column is one example of a target column.

Even in a case of a column being a non-zero column in matrix information illustrated in FIG. 3, in submatrix information relating to the matrix information, a value of an element included in a column in the submatrix information may be all zero. Consequently, model information to be calculated based on the submatrix information includes parameters being non-zero by a number of non-zero columns included in the submatrix information. When processing in accordance with a predetermined calculation procedure is executed in parallel, for example, only values being non-zero are communicated. Therefore, reducing a number of parameters being non-zero results in reducing an amount of communication.

Hereinafter, for convenience of explanation, model information to be generated based on submatrix information is referred to as "submodel information". Further, model information to be generated based on matrix information is referred to as "whole model information".

Figure 4:
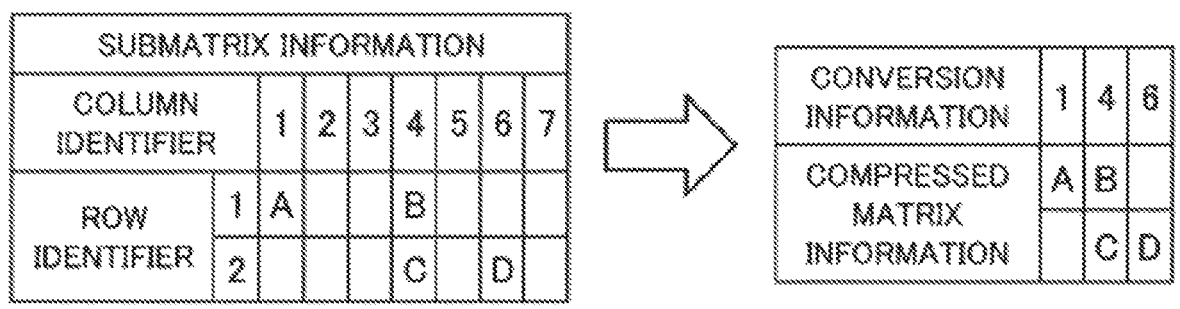
FIG. 4 is a diagram conceptually illustrating one example of processing in a matrix conversion unit.

Processing in the matrix conversion unit 104 will be described with reference to FIG. 4. FIG. 4 is a diagram conceptually illustrating one example of processing in the matrix conversion unit 104. In the example illustrated in FIG. 4, "A" to "D" represent values different from a predetermined value. A null value in submatrix information (or compressed matrix information) represents a predetermined value (e.g., zero). In FIG. 4, for aiding understanding, a configuration that submatrix information (or compressed matrix information) includes a memory area storing all values (specifically, "A" to "D", and a null value) is illustrated. However, it is not necessarily required that the submatrix information (or compressed matrix information) includes a memory area storing the predetermined value. Further, in submatrix information exemplified in FIG. 4, for convenience of explanation, a value of each of a row identifier and a column identifier is illustrated. However, the submatrix information may not necessarily include a row identifier or a column identifier.

The matrix conversion unit 104 inputs submatrix information, and specifies a column identifier identifying a non-zero column among the input submatrix information. The matrix conversion unit 104 calculates 1, 4, and 6 regarding submatrix information illustrated in FIG. 4, for example. The matrix conversion unit 104 generates conversion information including the specified column identifier, and compressed matrix information including elements included in the non-zero column. Specifically, the conversion information is information in which a column identifier identifying a non-zero column in the submatrix information, and a column identifier in the compressed matrix information are associated with each other. In the conversion information, for example, a fourth column in submatrix information, and a second column in the compressed matrix information are associated with each other. The matrix conversion unit 104 generates conversion information by focusing on a non-zero column (specifically, a target column). Alternatively, conversion information may be generated by focusing on a column including only an element taking value "zero". Specifically, processing in the matrix conversion unit 104 is not limited to the above-described processing.

For example, in submatrix information exemplified in FIG. 4, first, fourth, and sixth columns are non-zero columns. In this case, the matrix conversion unit 104 specifies the first, fourth, and sixth columns being non-zero columns in submatrix information, and generates conversion information including values (specifically, 1, 4, and 6) designating the specified columns. Further, the matrix conversion unit 104 generates compressed matrix information storing non-zero columns in an order of the first, fourth, and sixth columns. In a case of processing exemplified in FIG. 4, values of elements included in zero columns (specifically, the second, the third, the fifth, and the seventh columns) are not stored in compressed matrix information. Further, column identifiers (specifically, 2, 3, 5, and 7) identifying zero columns are not stored in conversion information.

Next, processing in the processing unit 105 will be described in detail. The processing unit 105 inputs compressed matrix information (exemplified in FIG. 4) generated by the matrix conversion unit 104, and generates submodel information (exemplified in FIG. 5) based on the compressed matrix information by executing processing in accordance with a predetermined processing procedure with respect to the input compressed matrix information. When a predetermined processing procedure is a logistic regression method, for example, the processing unit 105 determines parameters constituting submodel information, based on compressed matrix information, by executing processing in accordance with the logistic regression method with respect to the compressed matrix information. The processing unit 105 transmits the calculated submodel information to the master processing device 103.

Next, processing in the gather unit 106 will be described with reference to FIG. 5. FIG. 5 is a diagram conceptually illustrating processing in the gather unit 106. The gather unit 106 receives conversion information transmitted by the matrix conversion unit 104 in each worker processing device 102, and submodel information transmitted by the processing unit 105, and generates whole model information, based on the received conversion information and the received submodel information. The gather unit 106 receives, for example, two pieces of conversion information, and submodel information calculated based on compressed matrix information relating to the conversion information, as illustrated in FIG. 5, for example. The gather unit 106 specifies a column identifier in matrix information, based on the conversion information, regarding each element in the received submodel information, executes processing (an addition operation and the like) according to a predetermined processing procedure for the each specified column identifier, and thereby, generates whole model information. This processing is implementable by using an "All Reduce" function with which communication processing and operation processing are executed. Hereinafter, for convenience of explanation, processing in the gather unit 106 as described above is also referred to as "gather processing".

When a predetermined processing procedure is processed in parallel, it is possible to execute communication processing in a short time, by converting matrix information into compressed matrix information. A reason for this is that a number of columns included in each piece of compressed matrix information is smaller than a number of non-zero columns in matrix information. Specifically, as described above, since a number of values being a target to be transmitted and received regarding model information is reduced, it is possible to reduce an amount of communication in gather processing.

Next, processing in the model conversion unit 107 will be described with reference to FIG. 6. FIG. 6 is a diagram conceptually illustrating processing in the model conversion unit 107.

The model conversion unit 107 generates submodel information based on each piece of compressed matrix information, based on whole model information generated by the gather unit 106, and conversion information. More specifically, the model conversion unit 107 reads a column identifier included in conversion information relating to each piece of compressed matrix information, reads values in a column identified by the read column identifier among whole model information, and generates submodel information including the read values. Specifically, the submodel information is information as a basis for generating whole model information. When a predetermined processing procedure is processed in parallel, the model conversion unit 107 transmits the generated submodel information to the worker processing device 102, to which processing for the compressed matrix information is allocated.

Processing in the information processing system 101 is not necessarily limited to the above-described example. For example, processing may be executed in accordance with a "Stochastic Gradient Descent" algorithm. According to the algorithm, each worker processing device 102 decomposes data possessed by the worker processing device itself in terms of a unit called a mini-batch (see FIG. 7), and generates submodel information for the each decomposed mini-batch. FIG. 7 is a diagram conceptually illustrating submatrix information to be processed in terms of a mini-batch unit. In FIG. 7, for aiding understanding, submatrix information is illustrated by including all values. However, a value different from a predetermined value is not necessarily required to be stored in the submatrix information (or compressed matrix information). Further, in submatrix information exemplified in FIG. 7, for convenience of explanation, a value of each of a row identifier and a column identifier is illustrated. However, the submatrix information may not necessarily include a row identifier or a column identifier.

Regarding submatrix information exemplified in FIG. 7, processing of generating submatrix information as described above is executed in terms of a mini-batch unit for every two rows. The worker processing device 102 that executes processing for the submatrix information generates submodel information to a row identified by each mini-batch identifier in mini-batches identified by a mini-batch identifier "B1", a mini-batch identifier "B2", and a mini-batch identifier "B3". The worker processing device 102 generates submatrix information including third and fourth rows in submatrix information, regarding a mini-batch identified by the mini-batch identifier "B2", for example, and generates conversion information and compressed matrix information (exemplified in FIG. 4) to the generated submatrix information. The worker processing device 102 generates submodel information based on the compressed matrix information, and transmits, to the master processing device 103, the conversion information and the submodel information generated for each mini-batch.

In the master processing device 103, the gather unit 106 receives conversion information and submodel information transmitted by the worker processing device 102, and executes gather processing of gathering submodel information into whole model information, in accordance with the received conversion information. Thereafter, by executing processing similar to the above-described processing, the gather unit 106 generates submodel information in terms of a mini-batch unit from generated whole model information, based on received conversion information, and transmits the generated submodel information to the worker processing device 102.

Since a number of non-zero columns included in each mini-batch is reduced by processing submatrix information in terms of a decomposed mini-batch unit, it is possible to more efficiently store submatrix information in terms of a memory volume. A mini-batch may be a processing unit including a plurality of rows in submatrix information.

Next, processing in the information processing system 101 according to the first example embodiment will be described in detail with reference to FIG. 2. FIG. 2 is a sequence diagram illustrating a flow of processing in the information processing system 101 according to the first example embodiment.

In the worker processing device 102, the matrix conversion unit 104 specifies a non-zero column among input submatrix information (exemplified in FIG. 4), and generates compressed matrix information storing only the specified non-zero column, and conversion information (exemplified in FIG. 4) storing a column identifier of the specified non-zero column (Step S101). The worker processing device 102 transmits the generated conversion information to the master processing device 103 (Step S102).

The master processing device 103 receives the conversion information (exemplified in FIG. 4) transmitted by the worker processing device 102 (Step S106).

In the worker processing device 102, the processing unit 105 generates submodel information (exemplified in FIG. 5) based on compressed matrix information generated by the matrix conversion unit 104 in accordance with a predetermined processing procedure (Step S103), and transmits the generated submodel information to the master processing device 103 (Step S104).

The master processing device 103 receives the submodel information (exemplified in FIG. 5) transmitted by the worker processing device 102 (Step S107), and generates whole model information (exemplified in FIG. 5) by executing gather processing with respect to the received submodel information (Step S108). The master processing device 103 generates submodel information (exemplified in FIG. 6) based on the compressed matrix information generated in Step S101, based on the conversion information received in Step S106 and the generated whole model information (exemplified in FIG. 6) (Step S109), and transmits the generated submodel information to the worker processing device 102 (Step S110).

The worker processing device 102 receives the submodel information (exemplified in FIG. 6) transmitted by the master processing device 103 (Step S105).

Figure 8:
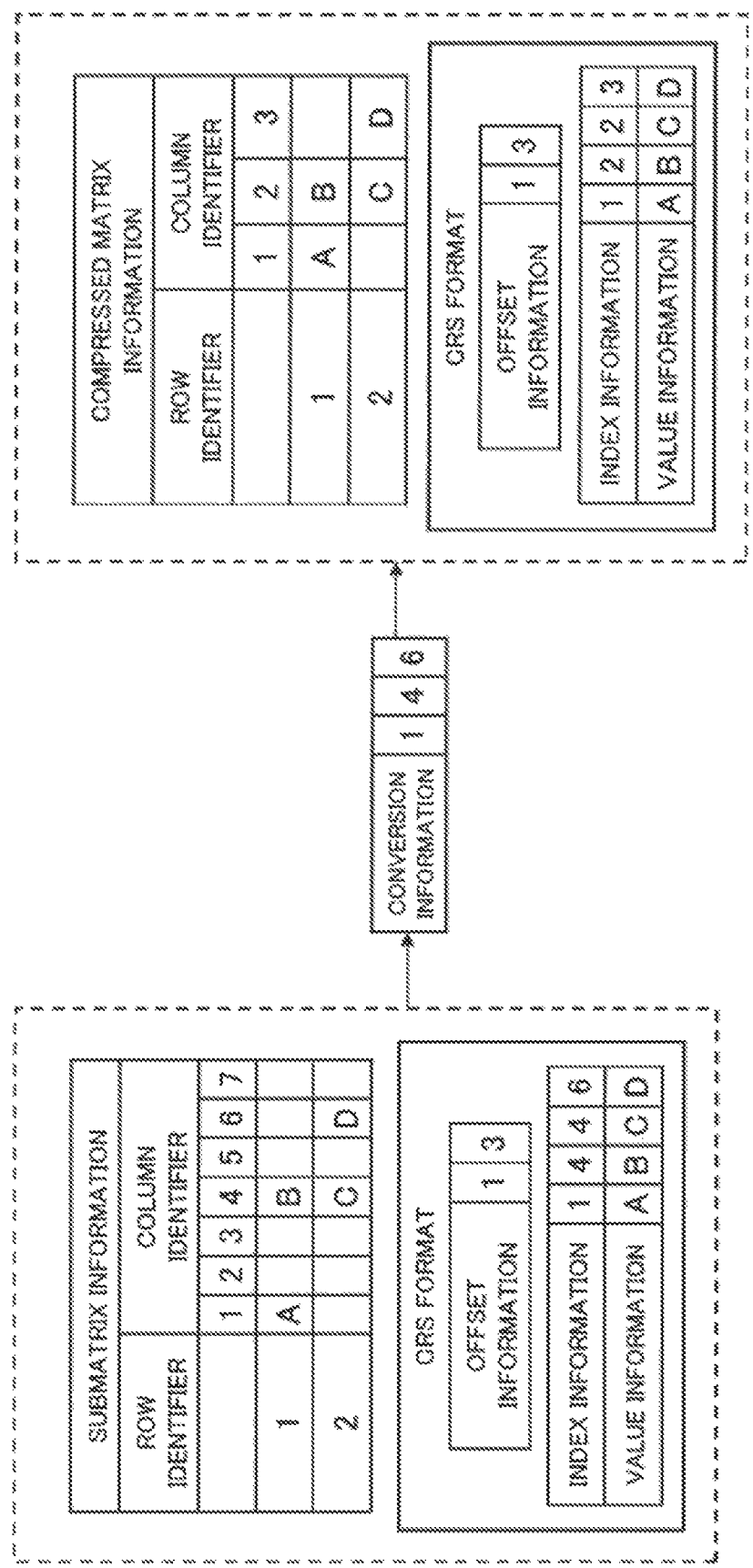
FIG. 8 is a diagram conceptually illustrating processing to be executed regarding matrix information (or submatrix information, or compressed matrix information).

In the examples illustrated in FIGS. 3 to 7, matrix information (or submatrix information, or compressed matrix information) is illustrated as a matrix having a two-dimensionally arranged data structure. Alternatively, as will be described with reference to FIG. 8, a data structure may not necessarily be a two-dimensionally arranged data structure. FIG. 8 is a diagram conceptually illustrating processing to be executed regarding matrix information (or submatrix information, or compressed matrix information). In FIG. 8, processing to be executed regarding matrix information (or submatrix information, or compressed matrix information) according to a data structure called a compressed row storage (CRS) format is conceptually illustrated. Further, in FIG. 8, an upper portion of a rectangle depicted by a dotted line illustrates submatrix information, and a lower portion of the rectangle illustrates a data structure when the submatrix information is stored in accordance with a CRS format.

A data structure of a CRS format, a coordinated (COO), or the like is one example of a data structure capable of volume-efficiently (memory-efficiently) storing matrix information called a sparse matrix including a large number of non-zero elements. According to a CRS format, value information including a value of a non-zero element among values of elements included in matrix information, index information including a column identifier identifying a column storing a non-zero element in the matrix information, and offset information designating a position corresponding to a delimiter of a row in the matrix information regarding an element of the index information, are stored in a memory or the like.

For convenience of explanation, as exemplified in FIG. 8, it is assumed that submatrix information is matrix information having two rows and seven columns, for example. In the example illustrated in FIG. 8, for convenience of explanation, a column identifier is annotated to a column, and a row number is annotated to a row. This does not mean, however, that submatrix information includes a row identifier or a column identifier. Further, it is assumed that information for specifying a position of a certain element, which is included in matrix information, is represented by a description format being "the (row identifier, column identifier) element".

With reference to FIG. 8, for example, based on the description format, in submatrix information, a non-zero value A is stored in the (1, 1) element, a non-zero value B is stored in the (1, 4) element, a non-zero value C is stored in the (2, 4) element, and a non-zero value D is stored in the (2, 6) element. In the submatrix information, values of elements other than the four elements are zero. According to a CRS format, value information including non-zero values A, B, C, and D is generated with respect to the submatrix information, and index information including a column identifier designating a column storing the four non-zero elements is generated. For example, in a case of submatrix information exemplified in FIG. 8, column identifiers 1, 4, 4, and 6 of the (1, 1) element, the (1, 4) element, the (2, 4) element, and the (2, 6) element storing a non-zero element are stored in index information. Further, in the index information, values stored in the first and second elements respectively represent a column identifier of an element included in the first row among non-zero elements in the submatrix information. In the index information, values stored in the third and fourth elements respectively represent a column identifier of an element included in the second row among non-zero elements in the submatrix information. Therefore, a row identifier in the submatrix information changes between the second and third elements in the index information. Thus, a value designating a first element representing a leading position of index information is stored in the first element of offset information, and a value designating a third element representing a delimiter between first and second rows of submatrix information in index information is stored in a second element of offset information.

Next, processing of generating compressed matrix information to the submatrix information in accordance with a CRS format will be described.

First, a memory area for storing information representing whether or not each column in submatrix information is a non-zero column is secured. Next, information representing whether or not each column in the submatrix information is a non-zero column is stored in the memory area. A column identifier identifying a non-zero column in matrix information is stored in conversion information. For example, since first, fourth, and sixth columns are non-zero columns in submatrix information exemplified in FIGS. 8, 1, 4, and 6 are stored in conversion information.

Next, the matrix conversion unit 104 generates compressed matrix information storing a value of an element included in a non-zero column in submatrix information. In a case of submatrix information exemplified in FIG. 8, elements included in the first, fourth, and sixth columns being non-zero columns are stored in compressed matrix information.

Next, the matrix conversion unit 104 converts index information of submatrix information into index information of compressed matrix information (hereinafter, referred to as "compressed matrix index information"), based on conversion information. For example, since a value "4" is stored in a second element in index information, and a same value "4" is stored in a first element in conversion information, a value "1" representing the first element is stored in a second element in compressed matrix index information. The matrix conversion unit 104 executes processing similar to the above-described processing also regarding another element included in index information. This processing is implementable by a binary search method or the like.

In the worker processing device 102, the matrix conversion unit 104 transmits the generated conversion information to the master processing device 103. The processing unit 105 generates submodel information, based on conversion information generated by the matrix conversion unit 104, and compressed matrix information having a data structure in accordance with a CRS format. A number of elements (parameters) included in submodel information is same as a number of elements included in conversion information, for example. In the worker processing device 102, the processing unit 105 transmits the generated submodel information to the master processing device 103. In this case, submodel information generated by the worker processing device 102 is submodel information based on compressed matrix information.

The master processing device 103 receives conversion information and submodel information (exemplified in FIG. 5) transmitted by the worker processing device 102, executes gather processing for the submodel information, based on the received conversion information and the received submodel information, and thereby, generates whole model information (exemplified in FIG. 5). A number of elements (parameters) included in the whole model information may coincide with a number of non-zero columns included in matrix information, for example.

The master processing device 103 generates submodel information (exemplified in FIG. 6) based on each piece of compressed matrix information, based on conversion information received from each worker processing device 102 and the whole model information (exemplified in FIG. 6), by executing processing as described with reference to FIG. 6, and transmits the generated submodel information to the worker processing device 102 that executes processing for the compressed matrix information.

The worker processing device 102 receives the submodel information (exemplified in FIG. 6) transmitted by the master processing device 103.

Processing as described above may be repeatedly executed in accordance with a predetermined calculation procedure, for example until the calculated whole model information converges, or until a predetermined number of repetitions is reached, or the like.

When processing is executed in terms of a mini-batch unit, processing as described above is executed by employing the mini-batch as a processing target.

In the first example embodiment, whole model information is generated by a communication configuration in which each worker processing device 102 communicates submodel information with the master processing device 103. Communication, however, is not necessarily required to follow the communication configuration. For example, a communication configuration may be a configuration in which communication is performed in accordance with a tree structure, as will be described later in a second example embodiment with reference to FIG. 9 and the like. Alternatively, as will be described later in a third example embodiment with reference to FIG. 16 and the like, a communication configuration may be a configuration in which whole model information is processed in parallel in a plurality of processing devices. Specifically, a configuration for generating whole model information is not limited to the above-described example.

Next, advantageous effects of the information processing system 101 according to the first example embodiment of the present invention will be described.

The information processing system 101 according to the first example embodiment can efficiently secure a memory area required for processing to matrix information in terms of a memory volume. A reason for this is that a memory area required for processing relating to compressed matrix information being a processing target is secured in terms of a volume depending on a number of columns for which processing is required.

Further, the information processing system 101 can efficiently execute processing in a predetermined processing procedure. A reason for this is that the information processing system 101 executes gather processing for submodel information in a memory area secured as described above. In other words, in the information processing system 101, as a result of executing gather processing by using a secured memory area, an amount of communication relating to an element (e.g. the above-described zero element) that is not a processing target is reduced between the master processing device 103 and the worker processing device 102. Consequently, in the information processing system 101, it is possible to reduce a communication time in gather processing.

Further, in the information processing system 101, it is possible to reduce a time required for processing in accordance with a predetermined processing procedure. A reason for this is that it is possible to effectively use a cache memory by executing processing in a memory area secured as described above. In other words, since only a non-zero column being a processing target among submatrix information is stored in the memory area secured as described above, a volume of the memory area is smaller than a volume required for storing the submatrix information. Therefore, by using the memory area secured as described above, possibility that submodel information is stored in a cache memory is high, and therefore, a cache hit rate improves. Thus, in the information processing system 101, it is possible to reduce a time required for processing in accordance with the predetermined processing procedure.

Further, in the matrix conversion unit 104, it is possible to store matrix information with a less memory volume. A reason for this is that only a column necessary for generating submodel information (specifically, a target column including at least one or more elements storing a value different from a predetermined value) is stored.

Further, in the matrix conversion unit 104, it is possible to determine communication required for processing matrix information in parallel in a short period. A reason for this is that conversion information to be provided by the matrix conversion unit 104 includes communication information in communication processing necessary in parallel processing. Including the communication information in the conversion information will be specifically described. When a predetermined processing procedure is a logistic regression method, for example, it is necessary to execute processing with respect to a column in matrix information. Therefore, when a predetermined processing procedure is a logistic regression method, for example, even in compressed matrix information arranged in each processing device, each processing device is required to gather a calculated value regarding an element included in a column identified by one column identifier. Since a column identifier identifying the column is stored in conversion information, it is possible to determine required communication in a short period, by referring to the conversion information.

Furthermore, in the information processing system 101, it is possible to provide information capable of implementing target processing in a short period. A reason for this is that the information processing system 101 provides a processing configuration capable of processing matrix information in parallel. For example, a parallel information processing system is able to reduce a time required for processing for the matrix information, by executing the processing in parallel in accordance with an allocation to be determined by the information processing system 101.

In the above-described example, processing for submatrix information is allocated to one processing device. Alternatively, the information processing system 101 may include an allocation unit for allocating, to a processing device, processing for submatrix information (exemplified in FIG. 3) generated by decomposing matrix information (exemplified in FIG. 3).

In the above-described example embodiment, in matrix information (or submatrix information, or compressed matrix information), processing in the information processing system 101 will be described by using terms called a row and a column, for convenience. However, a similar advantageous effect is provided by similar processing, even when a row and a column are interchanged. Hereinafter, similarly to the first example embodiment, processing will be described by using terms called a row and a column, for convenience. However, a similar advantageous effect is provided by similar processing, even when a row and a column are interchanged.

Second Example Embodiment

Next, a second example embodiment according to the present invention on the basis of the above-described first example embodiment will be described.

In the following description, a characteristic portion according to the present example embodiment will be mainly described, and overlapping description will be omitted by indicating components similar to those in the above-described first example embodiment with same reference numbers.

Figure 9:
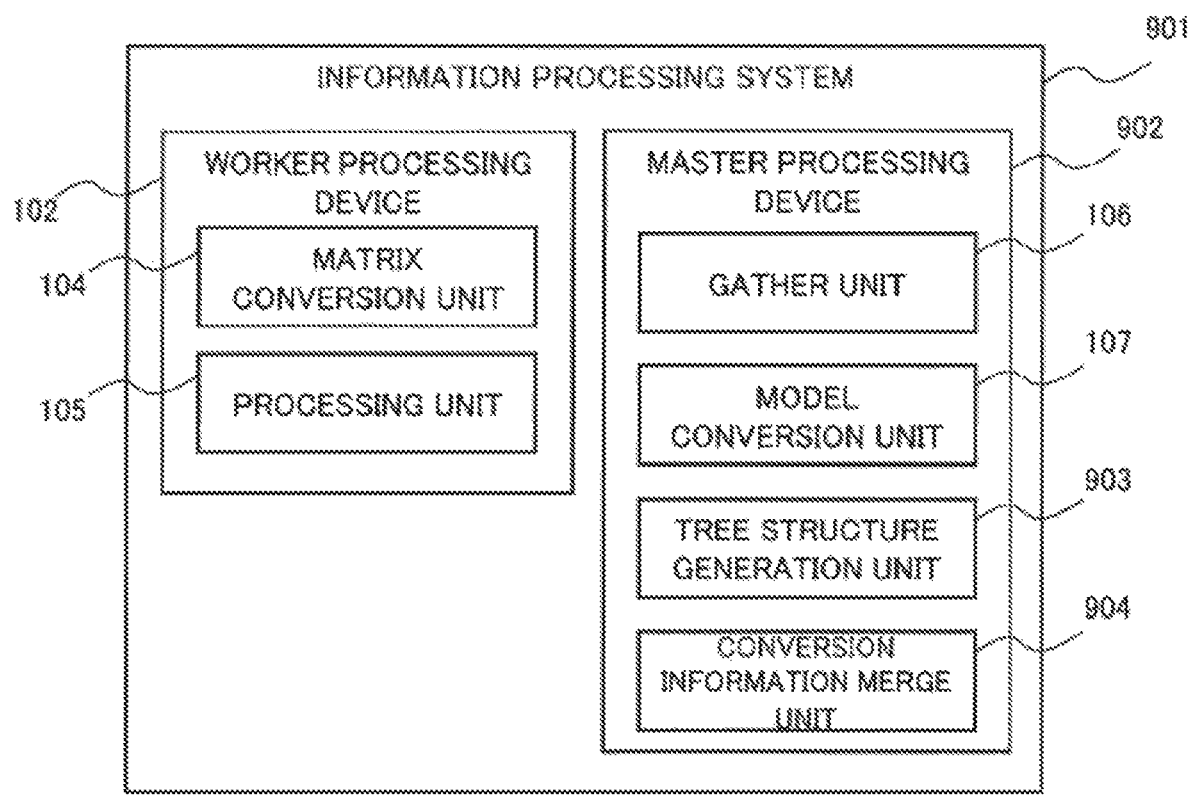
FIG. 9 is a block diagram illustrating a configuration of an information processing system according to a second example embodiment of the present invention.

A configuration of an information processing system 901 according to the second example embodiment of the present invention will be described with reference to FIG. 9. FIG. 9 is a block diagram illustrating a configuration of the information processing system 901 according to the second example embodiment of the present invention.

The information processing system 901 according to the second example embodiment includes a worker processing device 102 and a master processing device 902. The worker processing device 102 includes a matrix conversion unit (matrix converter) 104 and a processing unit (processor) 105. The master processing device 902 includes a gather unit (gatherer) 106, a model conversion unit (model converter) 107, a tree structure generation (determination) unit (tree structure generator) 903, and a conversion information merge unit (conversion information merger) 904. In the information processing system 901, a number of the master processing devices 902 is, for example, one. However, the master processing device 902 may have a function included in the worker processing device 102.

Figure 11:
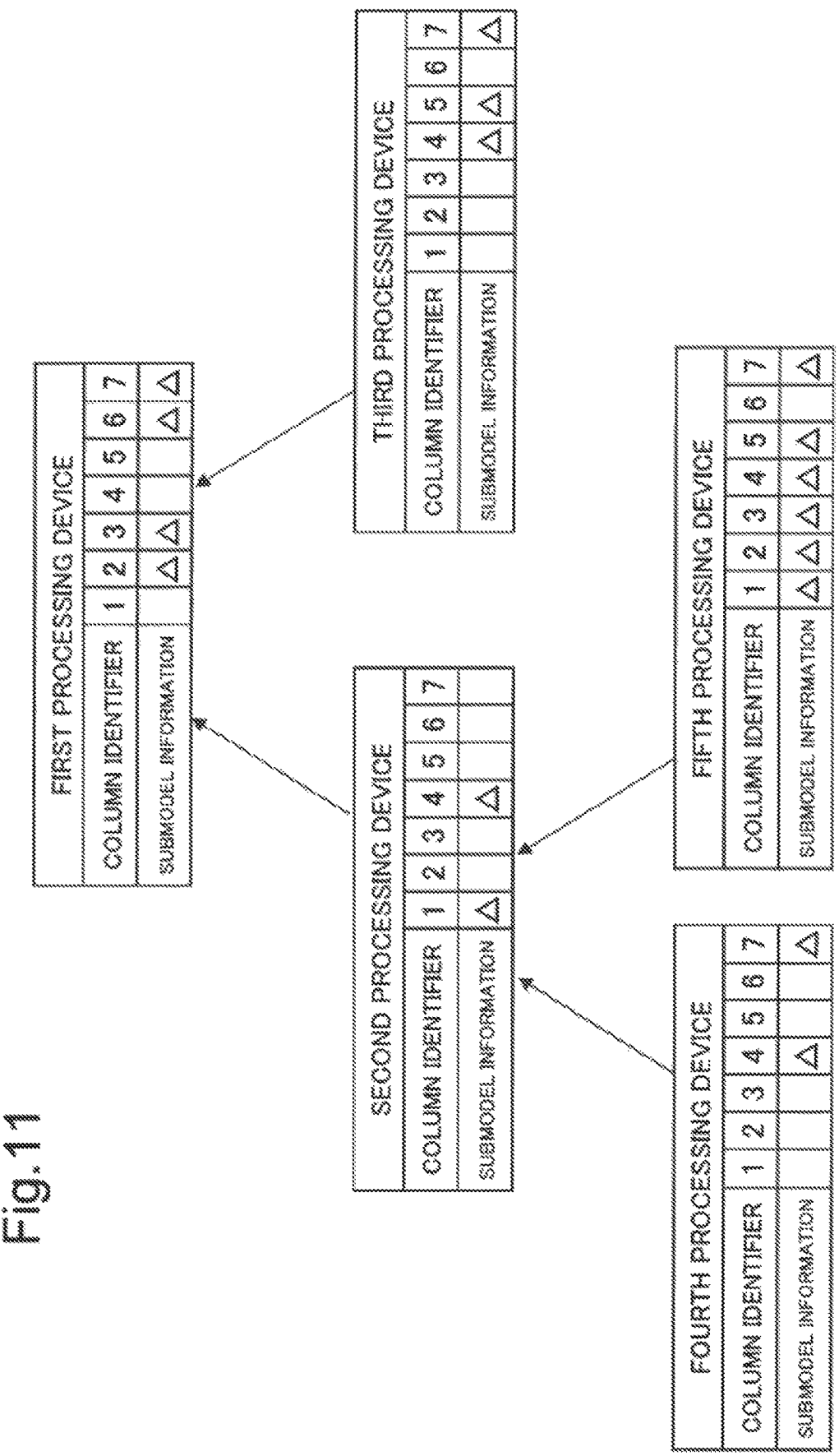
FIG. 11 is a diagram conceptually illustrating processing of generating whole model information while communicating in accordance with a tree structure.

Processing of generating whole model information while communicating in accordance with a tree structure will be described with reference to FIG. 11. FIG. 11 is a diagram conceptually illustrating processing of generating whole model information, while communicating in accordance with a tree structure. In FIG. 11, "A" mark denotes a non-zero element.

For convenience of explanation, it is assumed that whole model information includes first to seventh elements. It is assumed that a first processing device calculates submodel information including the second, third, sixth, and seventh elements as non-zero elements. It is assumed that a second processing device calculates submodel information in which the first and fourth elements are non-zero elements. It is assumed that a third processing device calculates submodel information in which the fourth, fifth, and seventh elements are non-zero elements. It is assumed that a fourth processing device calculates submodel information in which the fourth and seventh elements are non-zero elements. It is assumed that a fifth processing device calculates submodel information in which the first to fifth, and seventh elements are non-zero elements. For convenience of explanation, in FIG. 11, processing is illustrated in a configuration in which each processing device processes whole model information. However, as described above, each processing device executes processing regarding submodel information including only a non-zero element, for example.

The fourth and fifth processing devices transmit, to the second processing device, submodel information generated in each processing device. The second processing device receives submodel information transmitted by the fourth processing device and submodel information transmitted by the fifth processing device, and generates, based on the received two pieces of submodel information and submodel information calculated by the second processing device itself, submodel information in which the three pieces of submodel information are gathered. In this case, gathered submodel information is submodel information in which the first to fifth, and seventh elements are non-zero elements. The second processing device transmits generated submodel information to the first processing device. The third processing device transmits generated submodel information to the first processing device. The first processing device receives the submodel information transmitted by the second processing device and the submodel information transmitted by the third processing device, and generates whole model information, based on the received two pieces of submodel information, and submodel information generated by the first processing device itself.

An amount of communication in the processing will be described. As described above, a number of non-zero elements included in submodel information generated in the fourth processing device is two. A number of non-zero elements included in submodel information generated in the fifth processing device is six. Consequently, the second processing device receives eight (=2+6) non-zero elements. The second processing device generates submodel information in which the first to fifth, and seventh elements are non-zero elements, based on received submodel information, and submodel information generated by the second processing device itself. Consequently, a number of non-zero elements included in submodel information generated in the second processing device is six. The first processing device receives nine (=6+3) non-zero elements. Therefore, in processing of generating whole model information, it is necessary to communicate seventeen (=8+9) non-zero elements.

In processing of transmitting submodel information based on compressed matrix information, based on whole model information and conversion information, the submodel information is transmitted in a direction opposite to a direction of communication processing executed in gather processing. Specifically, in the example illustrated in FIG. 11, the first processing device transmits submodel information to the second and third processing devices, and thereafter, the second processing device transmits submodel information to the fourth and fifth processing devices.

Figure 12:
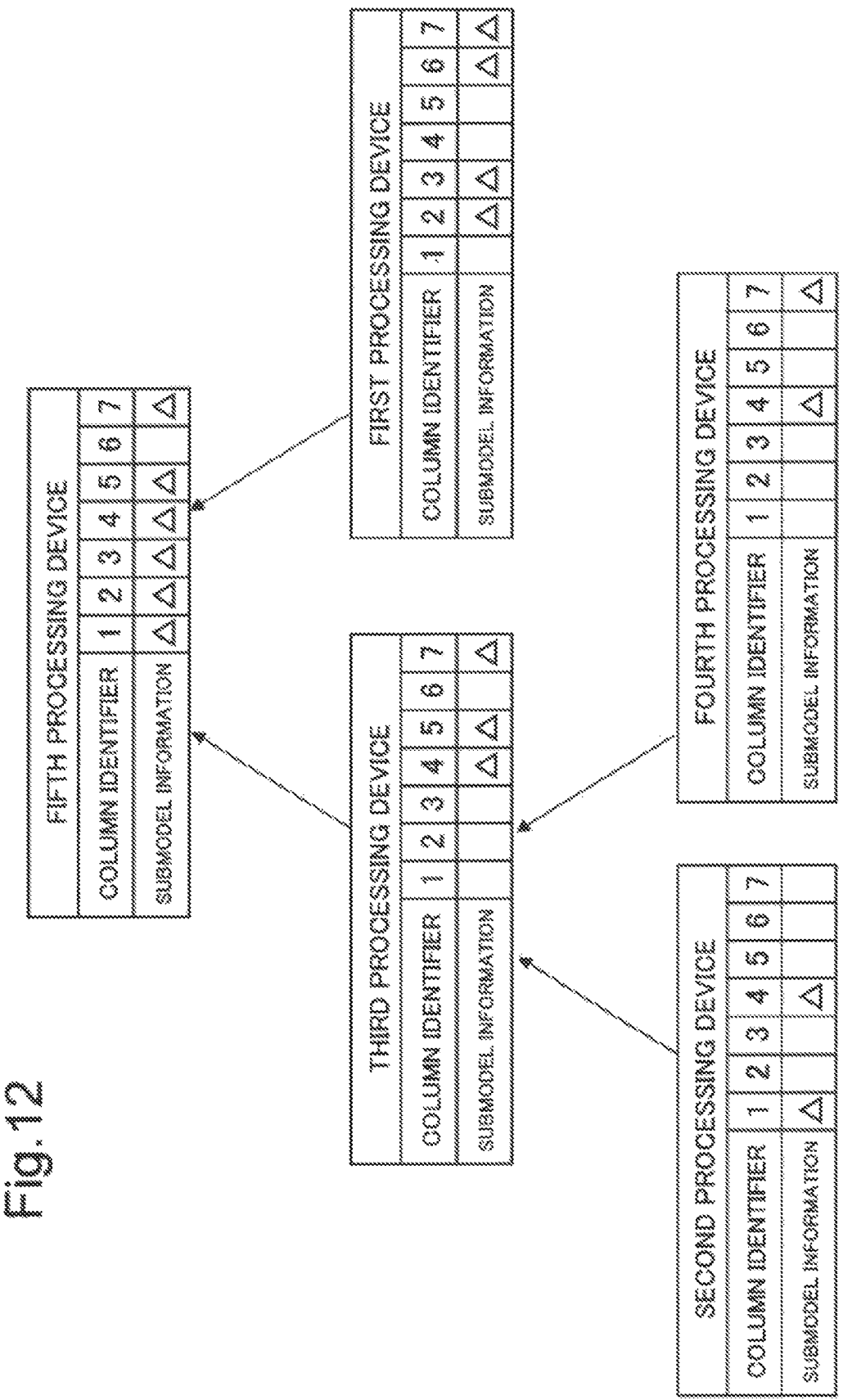
FIG. 12 is a diagram conceptually illustrating processing of generating whole model information while communicating in accordance with a tree structure.

Capability of reducing an amount of communication by changing an order of communication by processing devices will be described with reference to FIG. 12. FIG. 12 is a diagram conceptually illustrating processing of generating whole model information, while communicating in accordance with a tree structure.

In this example, the second and fourth processing devices respectively transmit submodel information to the third processing device. The third processing device generates, based on pieces of submodel information transmitted by the second and fourth processing devices and submodel information calculated by the third processing device itself, submodel information in which the three pieces of submodel information are gathered, and transmits the generated submodel information to the fifth processing device. The fifth processing device receives submodel information transmitted by the third processing device, and submodel information transmitted by the first processing device. Therefore, the third processing device receives four (=2+2) non-zero elements, and thereafter, generates submodel information (specifically, gathered submodel information) including four non-zero elements (first, fourth, fifth, and seventh elements). The fifth processing device receives eight (=4+4) non-zero elements. Therefore, in processing of generating whole model information, it is necessary to communicate twelve (4+8) non-zero elements. Thus, it is possible to implement processing in which an amount of communication is smaller than the above-described processing, by changing an order of communication by processing devices.

Processing in which an amount of communication is small is implementable by arranging a processing device for calculating submodel information in which a number of non-zero elements is large near (specifically, at an upper order of) a root node in a tree structure and arranging a processing device for calculating submodel information in which a number of non-zero elements is small near (specifically, at a lower order of) a leaf node in a tree structure. As described above, a number of non-zero elements included in submodel information is determined depending on a number of non-zero columns in compressed matrix information as a basis for which the submodel information is generated.

In the following description, a node other than a root node and a leaf node is referred to as an "intermediate node".

In a tree structure, a processing device arranged at a parent node of a certain node with respect to a certain processing device arranged at the certain node is referred to as a "parent processing device" of the certain processing device. Further, in a tree structure, a processing device arranged at a child node of a certain node with respect to a certain processing device arranged at the certain node is referred to as a "child processing device" of the certain processing device. For example, in the example illustrated in FIG. 11, a parent processing device of the second processing device is the first processing device. In the example illustrated in FIG. 11, child processing devices of the second processing device are the fourth and fifth processing devices. A parent processing device of the fourth processing device is the second processing device. The fourth processing device has no child processing device.

Figure 13:
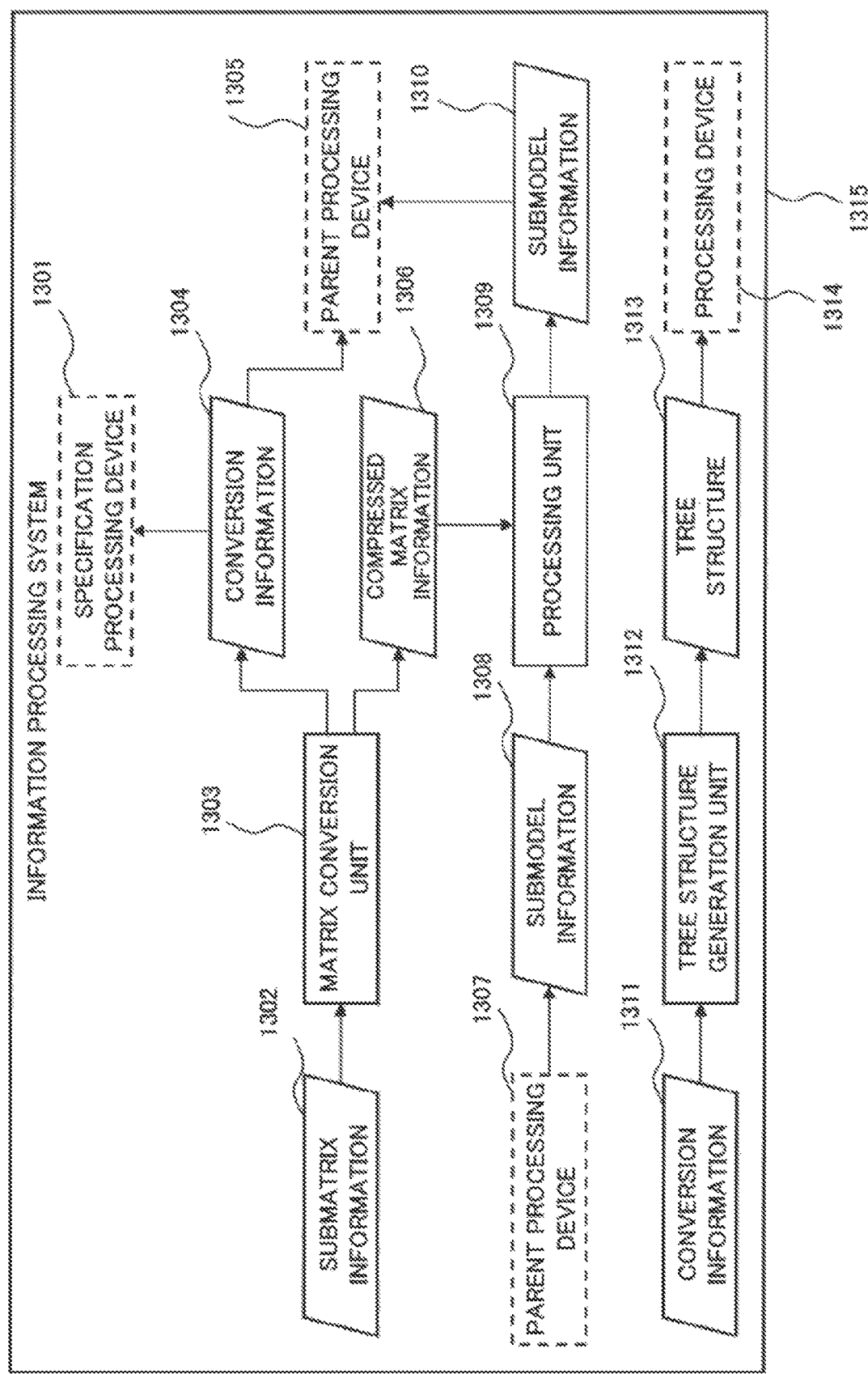
FIG. 13 is a diagram conceptually illustrating processing in the information processing system.
Figure 14:
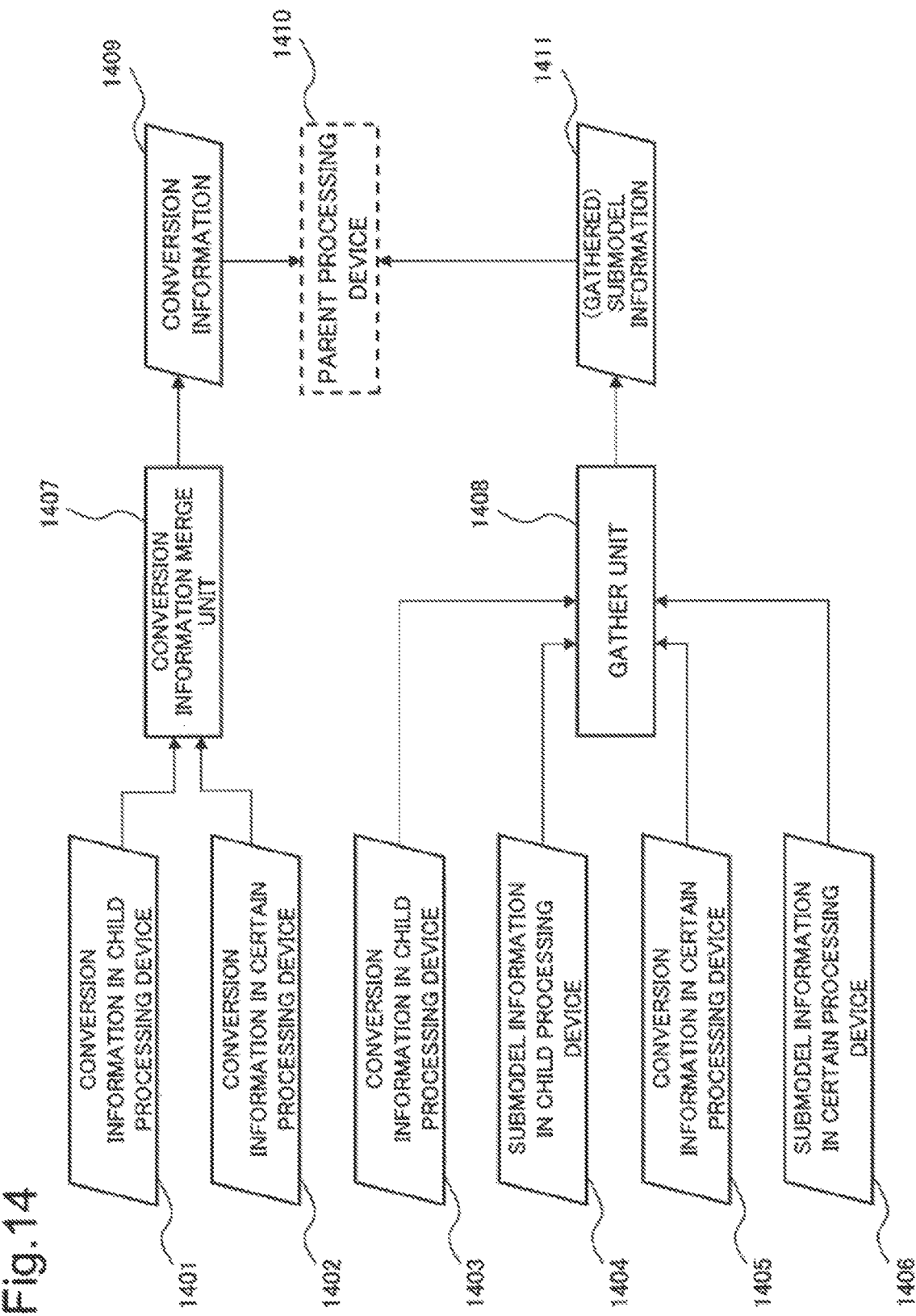
FIG. 14 is a diagram conceptually illustrating processing in the information processing system.
Figure 15:
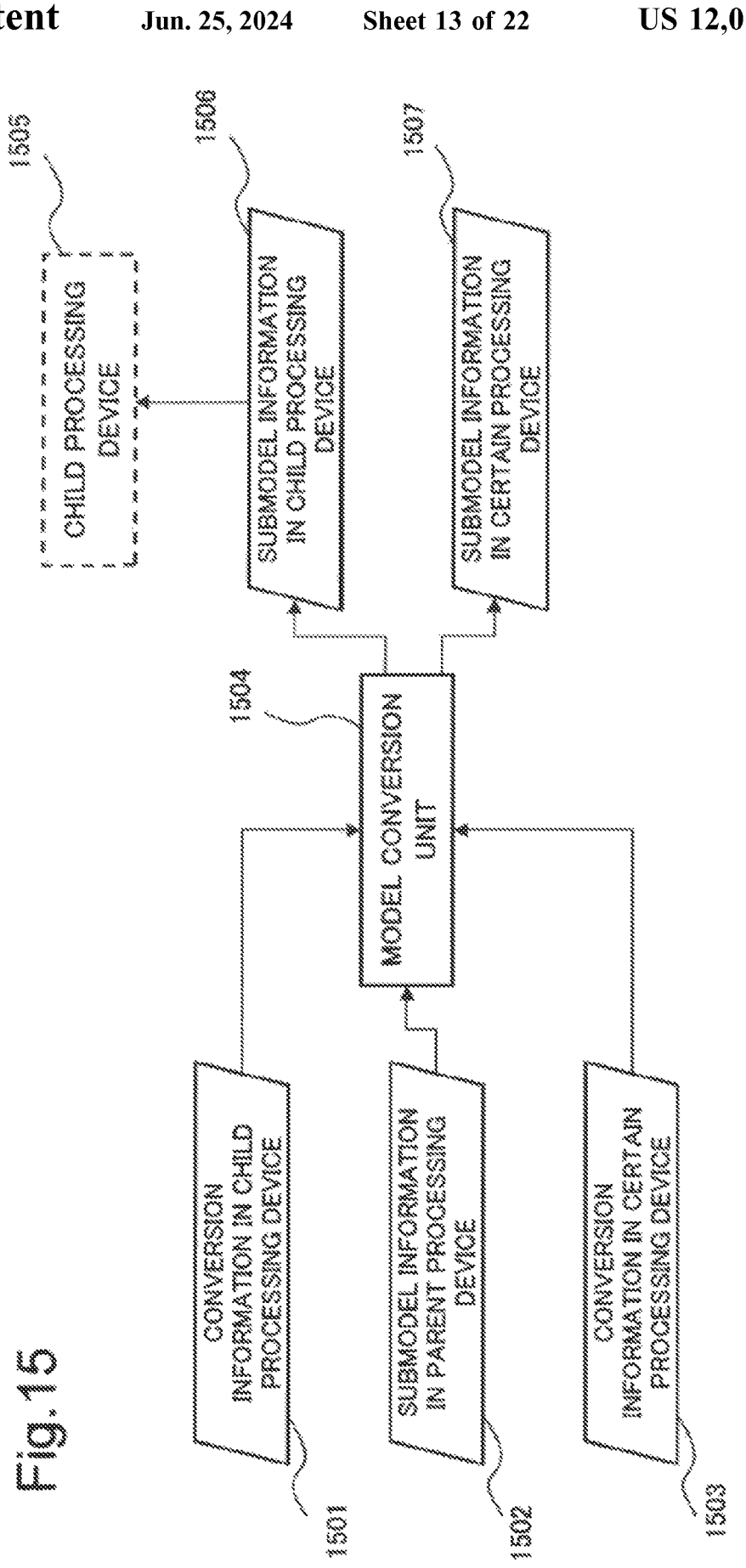
FIG. 15 is a diagram conceptually illustrating processing in the information processing system.

Processing for input and output particularly, among processing in the information processing system 901, will be described with reference to FIGS. 13 to 15. FIGS. 13 to 15 are diagrams conceptually illustrating processing in the information processing system 901.

In an information processing system 1315 illustrated in FIG. 13, operations of a matrix conversion unit (matrix converter) 1303 and a processing unit (processor) 1309 are similar to processing described with reference to FIG. 1 in the first example embodiment. However, a communication destination to which conversion information 1304 and submodel information 1310 are communicated is not necessarily similar to the processing. For example, each processing device transmits, to a parent processing device 1305 of the processing device, the conversion information 1304 and the submodel information 1310. Each processing device further transmits, to a specification processing device 1301 for determining a communication order of processing devices, the conversion information 1304 generated in the processing device itself.

In the specification processing device 1301, a tree structure generation (determination) unit (tree structure generator) 1312 receives conversion information 1311 transmitted by each processing device, and determines a communication order of processing devices, based on a number of elements (size) included in the received conversion information 1311. In other words, the tree structure generation unit 1312 generates a tree structure 1313 representing a communication order of processing devices. In the specification processing device 1301, the tree structure generation (determination) unit 1312 transmits, to each processing device 1314, an identifier identifying a parent processing device arranged as a parent node of a node to which the processing device is allocated, and an identifier identifying a child processing device arranged as a child node of the node to which the processing device is allocated. Each processing device receives an identifier identifying a parent processing device and an identifier identifying a child processing device, which are transmitted by the specification processing device 1301. Hereinafter, each processing device performs communication with a parent processing device of the processing device, or with a child processing device of the processing device, based on these received identifiers.

Referring to FIG. 14, in a processing device arranged at each of an intermediate node and a root node, a conversion information merge unit (conversion information merger) 1407 receives conversion information 1401 transmitted by a child processing device of the processing device itself, and generates conversion information 1409 including the received conversion information 1401 and conversion information 1402 generated by the processing device itself. In a processing device arranged at an intermediate node, the conversion information merge unit (conversion information merger) 1407 transmits the generated conversion information 1409 to a parent processing device 1410 of the processing device itself.

In a processing device arranged at each of an intermediate node and a root node, a gather unit (gatherer) 1408 generates submodel information 1411 after gathering, by gathering conversion information 1403 transmitted by a child processing device of the processing device itself, submodel information 1404 transmitted by a child processing device of the processing device itself, conversion information 1405 generated by the processing device itself, and submodel information 1406 generated by the processing device itself. In this case, the submodel information 1411 to be generated by the gather unit 1408 in a processing device arranged at the root node is whole model information (specifically, model information in which pieces of submodel information in all processing devices are gathered). In a processing device arranged at an intermediate node, the gather unit 1408 transmits, to the parent processing device 1410 of the processing device itself, the generated submodel information 1411.

In a tree structure illustrated in FIG. 11 (or FIG. 12), submodel information is generated by a model conversion unit 1504, in an order from a processing device arranged at a root node in the tree structure to a processing device arranged at a lower node in the tree structure. In a processing device arranged at an intermediate node, the model conversion unit 1504 generates submodel information 1507 being a target to be processed by the processing device itself, based on submodel information 1502 transmitted by a parent processing device of the processing device itself, and conversion information 1503 generated by the processing device itself. In a processing device arranged at an intermediate node, the model conversion unit 1504 generates submodel information 1506 being a target to be processed by a child processing device of the processing device itself, based on the generated conversion information 1503 and conversion information 1501 received from the child processing device, and transmits the generated submodel information to the child processing device 1505.

Figure 10:
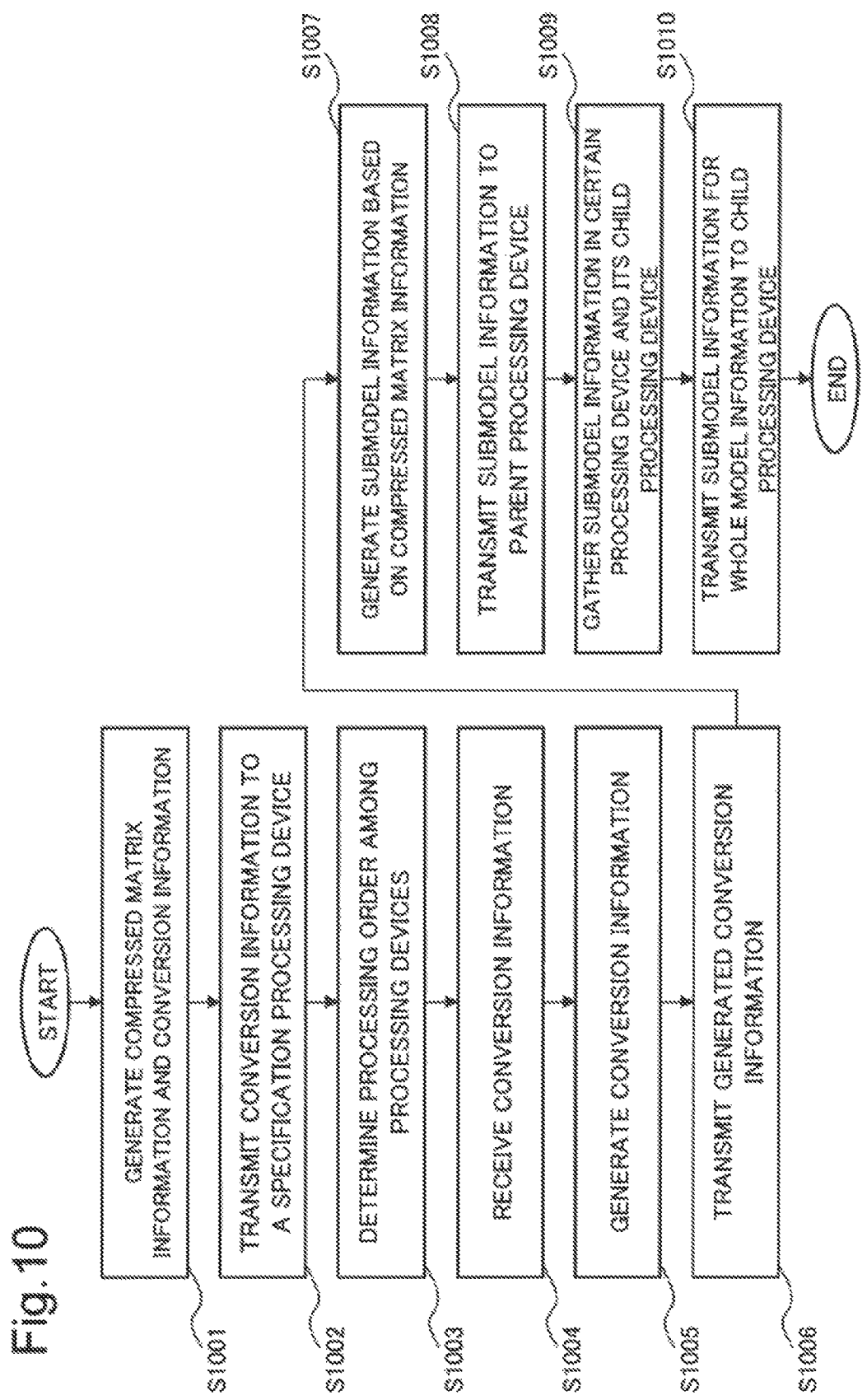
FIG. 10 is a flowchart illustrating a flow of processing in the information processing system according to the second example embodiment.

Next, a flow of processing in the information processing system 901 according to the second example embodiment of the present invention will be described with reference to FIG. 10. FIG. 10 is a flowchart illustrating a flow of processing in the information processing system 901 according to the second example embodiment.

First, in a processing device arranged at each node within a tree structure, the matrix conversion unit 104 generates compressed matrix information storing a value of an element in a non-zero column among submatrix information, and conversion information representing a correspondence among a column in the compressed matrix information and a column in the submatrix information (Step S1001). Next, each processing device transmits the conversion information to a specification processing device as described above (Step S1002). The specification processing device receives conversion information transmitted by each processing device, and allocates each processing device from an upper node in a tree structure in a descending order of a number of elements (specifically, a number of non-zero elements) included in conversion information transmitted by the processing device. Specifically, the specification processing device determines a processing order of processing devices, by generating a tree structure representing an order of communication by processing devices in the information processing system 901 (Step S1003).

Next, in each processing device arranged at an intermediate node and a root node, the processing device receives conversion information transmitted by a child processing device of the processing device itself (Step S1004), generates conversion information (conversion information after merging) including the received conversion information and conversion information generated by the processing device itself (Step S1005), and transmits generated conversion information to a parent processing device of the processing device itself (Step S1006).

Then, each processing device generates submodel information based on compressed matrix information allocated to the processing device, based on conversion information (Step S1007). A number of elements included in the conversion information, and a number of elements included in the submodel information may be the same. Specifically, each processing device generates the submodel information by executing processing in accordance with a predetermined processing procedure with respect to compressed matrix information. In a processing device arranged at each of an intermediate node and a leaf node, the processing device transmits generated submodel information to a parent processing device of the processing device itself (Step S1008).

In each processing device arranged at an intermediate node and a root node, the processing device generates submodel information in which submodel information transmitted by a child processing device of the processing device itself and submodel information generated by the processing device itself are gathered, in accordance with conversion information. Specifically, the processing device executes gather processing of gathering submodel information transmitted by a child processing device of the processing device itself and submodel information generated by the processing device itself (Step S1009).

Below-described processing is executed in an order from a processing device arranged at an upper order in a tree structure (exemplified in FIGS. 11 and 12) until a processing device arranged at a lower order in the tree structure. The model conversion unit 107 in each processing device receives submodel information transmitted by a parent processing device of the processing device itself. The model conversion unit 107 generates submodel information being a target to be processed by the processing device itself from the submodel information, in accordance with conversion information generated by the processing device itself. Further, the model conversion unit 107 generates submodel information being a target to be processed by a child processing device of the processing device itself from the submodel information, in accordance with conversion information transmitted by the child processing device, and transmits the generated submodel information to the child processing device (Step S1010).

Processing as described above is repeatedly executed in accordance with a method defined in a predetermined processing procedure, for example, until the calculated whole model information converges, until a predetermined number of repetitions is reached, or the like.

Further, when processing is executed in terms of a mini-batch unit, processing similar to processing as described above is executed regarding conversion information generated in terms of a mini-batch unit.

Next, advantageous effects of the information processing system 901 according to the second example embodiment of the present invention will be described.

The information processing system 901 according to the second example embodiment can efficiently secure a memory area required for processing to matrix information in terms of a volume. A reason for this is that a memory area required for processing for compressed matrix information being a processing target is secured in terms of a volume depending on a number of columns for which processing is required, similarly to a reason described in the first example embodiment.

Further, the information processing system 901 according to the present example embodiment provides an advantageous effect that a time required for processing in accordance with a predetermined processing procedure is further reduced. A reason for this is that the information processing system 901 determines a communication order in such a way that a number of non-zero elements to be communicated in communication processing is reduced in accordance with processing as described with reference to FIG. 12. In other words, since a data volume of compressed matrix information having a small number of columns is smaller than a data volume of compressed matrix information having a large number of columns, an amount of communication is reduced in the information processing system 901 according to the present example embodiment. Specifically, in the information processing system 901 according to the present example embodiment, a time required for processing in accordance with a predetermined processing procedure is further reduced.

Third Example Embodiment

Next, a third example embodiment according to the present invention on the basis of the above-described first example embodiment will be described.

In the following description, a characteristic portion according to the present example embodiment will be mainly described, and overlapping description will be omitted by indicating components similar to those in the above-described first example embodiment with same reference numbers.

Figure 16:
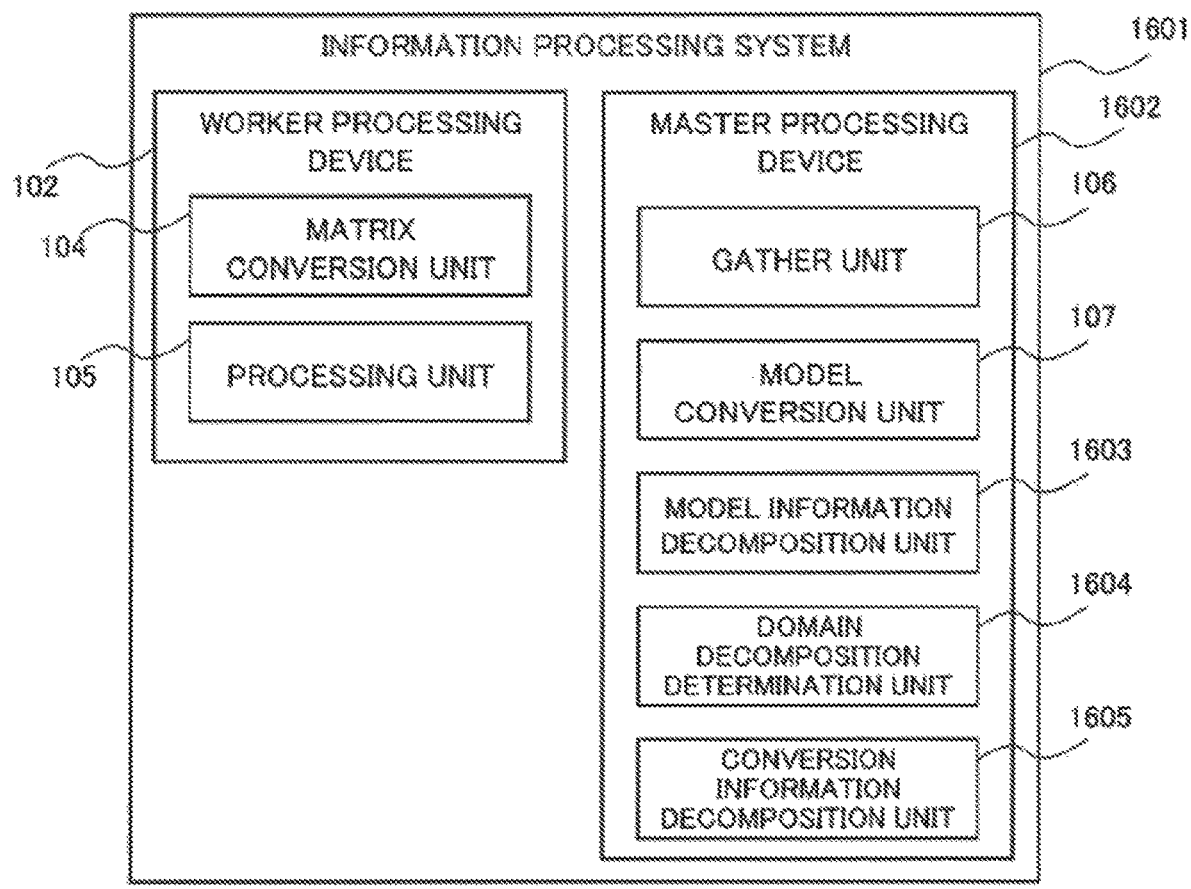
FIG. 16 is a block diagram illustrating a configuration of an information processing system according to a third example embodiment of the present invention.

Processing in an information processing system 1601 according to the third example embodiment of the present invention will be described with reference to FIG. 16. FIG. 16 is a block diagram illustrating a configuration of the information processing system 1601 according to the third example embodiment of the present invention.

The information processing system 1601 according to the third example embodiment of the present invention includes a worker processing device 102 and a master processing device 1602. The worker processing device 102 includes a matrix conversion unit (matrix converter) 104 and a processing unit (processor) 105. The master processing device 1602 includes a conversion information decomposition unit (conversion information decomposer) 1605, a model information decomposition unit (model information decomposer) 1603, a domain decomposition determination unit (domain decomposition determiner) 1604, a gather unit (gatherer) 106, and a model conversion unit (model converter) 107.

The matrix conversion unit 104 and the processing unit 105 respectively execute processing similar to the processing described in the first example embodiment with reference to FIG. 2.

Figure 20:
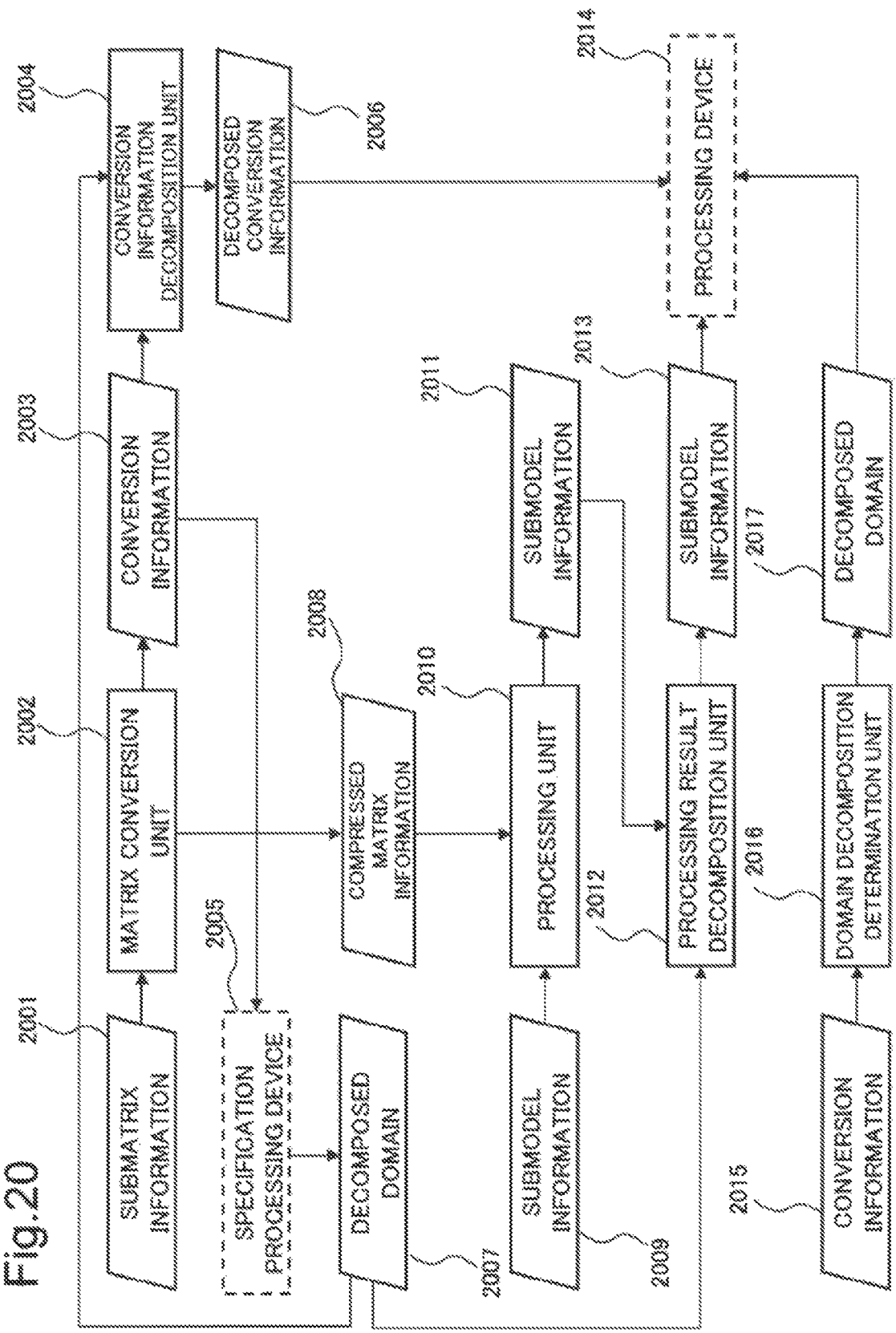
FIG. 20 is a diagram conceptually illustrating processing in the information processing system.

In particular, processing in the information processing system 1601 will be described mainly on information to be input and output in the information processing system 1601 with reference to FIG. 20. FIG. 20 is a diagram conceptually illustrating processing in the information processing system 1601.

In the information processing system 1601 illustrated in FIG. 20, processing in a matrix conversion unit (matrix converter) 2002 and a processing unit (processor) 2010 is similar to processing described in the first example embodiment with reference to FIG. 1. However, a communication destination to which conversion information and submodel information are communicated is not necessarily similar to the processing.

Each processing device transmits conversion information 2015 to a specification processing device 2005 (or a domain decomposition determination unit (domain decomposition determiner) 2016) being a processing device for determining a decomposed domain. In the specification processing device 2005, the domain decomposition determination unit 2016 receives the conversion information 2015, and determines a decomposed domain 2017 corresponding to allocation to each processing device 2014 in a processing domain relating to the received conversion information 2015, by executing processing as will be described later with reference to FIGS. 18 and 19. The domain decomposition determination unit 2016 transmits the determined decomposed domain 2017 to each processing device 2014.

In each processing device 2014, a conversion information decomposition unit (conversion information decomposer) 2004 receives a decomposed domain 2007 (specifically, the decomposed domain 2017) transmitted by the specification processing device 2005, decomposes conversion information 2003 into a piece of decomposed conversion information 2006 for each processing device, based on the received decomposed domain 2007, and transmits the piece of decomposed conversion information 2006 to each processing device 2014. Further, in each processing device 2014, a processing result decomposition unit (processing result decomposer) 2012 also decomposes submodel information 2011, based on the received decomposed domain 2007 (specifically, the decomposed domain 2017), and transmits submodel information 2013 in the decomposed domain 2007 to the processing device 2014 to which the processing is allocated.

Figure 21:
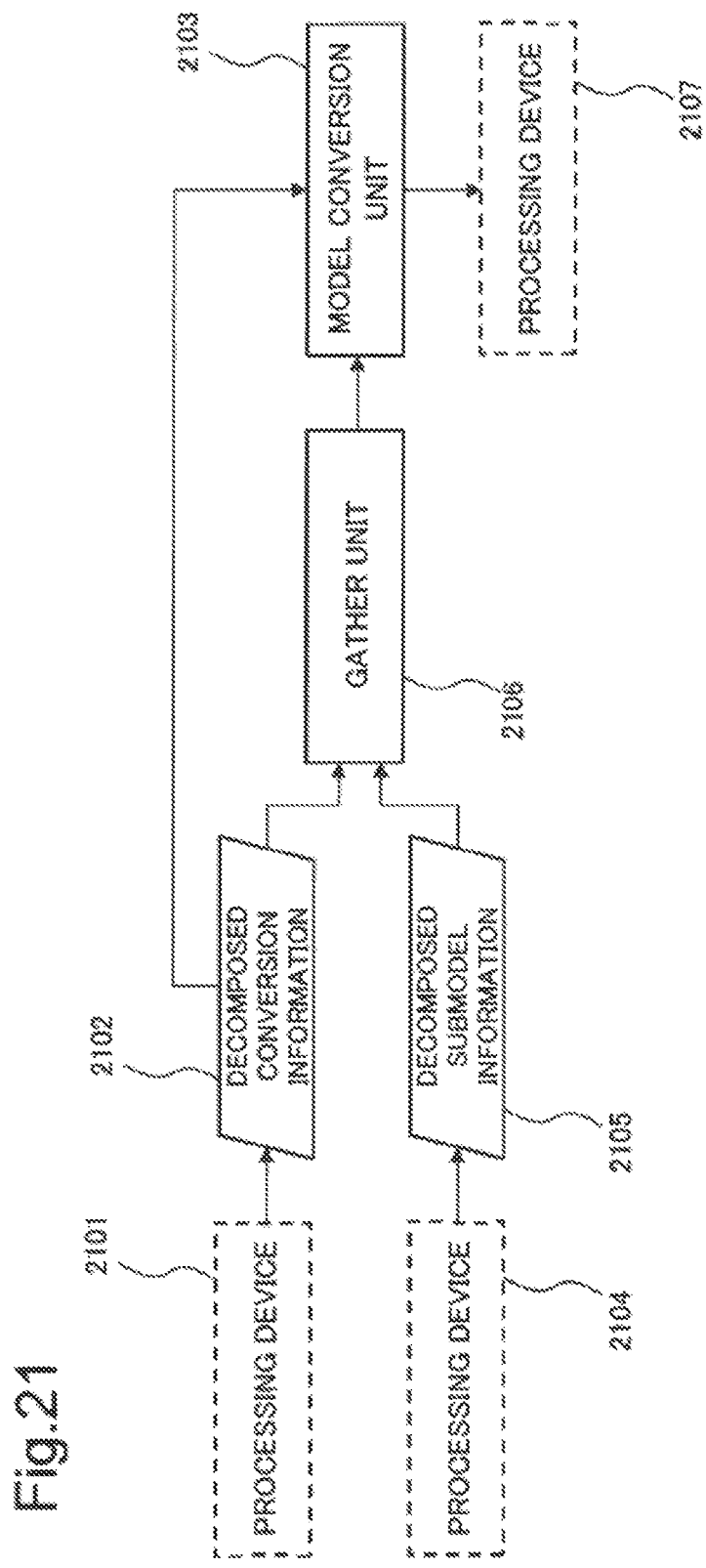
FIG. 21 is a diagram conceptually illustrating processing in the information processing system.

In particular, processing in the information processing system 1601 will be described mainly on processing in a gather unit (gatherer) 2106 with reference to FIG. 21. FIG. 21 is a diagram conceptually illustrating processing in the information processing system 1601.

In each processing device, the gather unit 2106 receives a piece of decomposed conversion information 2102 and a piece of decomposed submodel information 2105 transmitted by another processing device (e.g., processing devices 2101 and 2104), and executes gather processing of gathering the received piece of decomposed submodel information 2105 into whole model information. Further, in each processing device, the model conversion unit 2103 reads a value of an element in a domain allocated to each processing device, in accordance with the piece of decomposed conversion information 2102, and transmits the read value of the element to the processing device (e.g., a processing device 2107).

Figure 18:
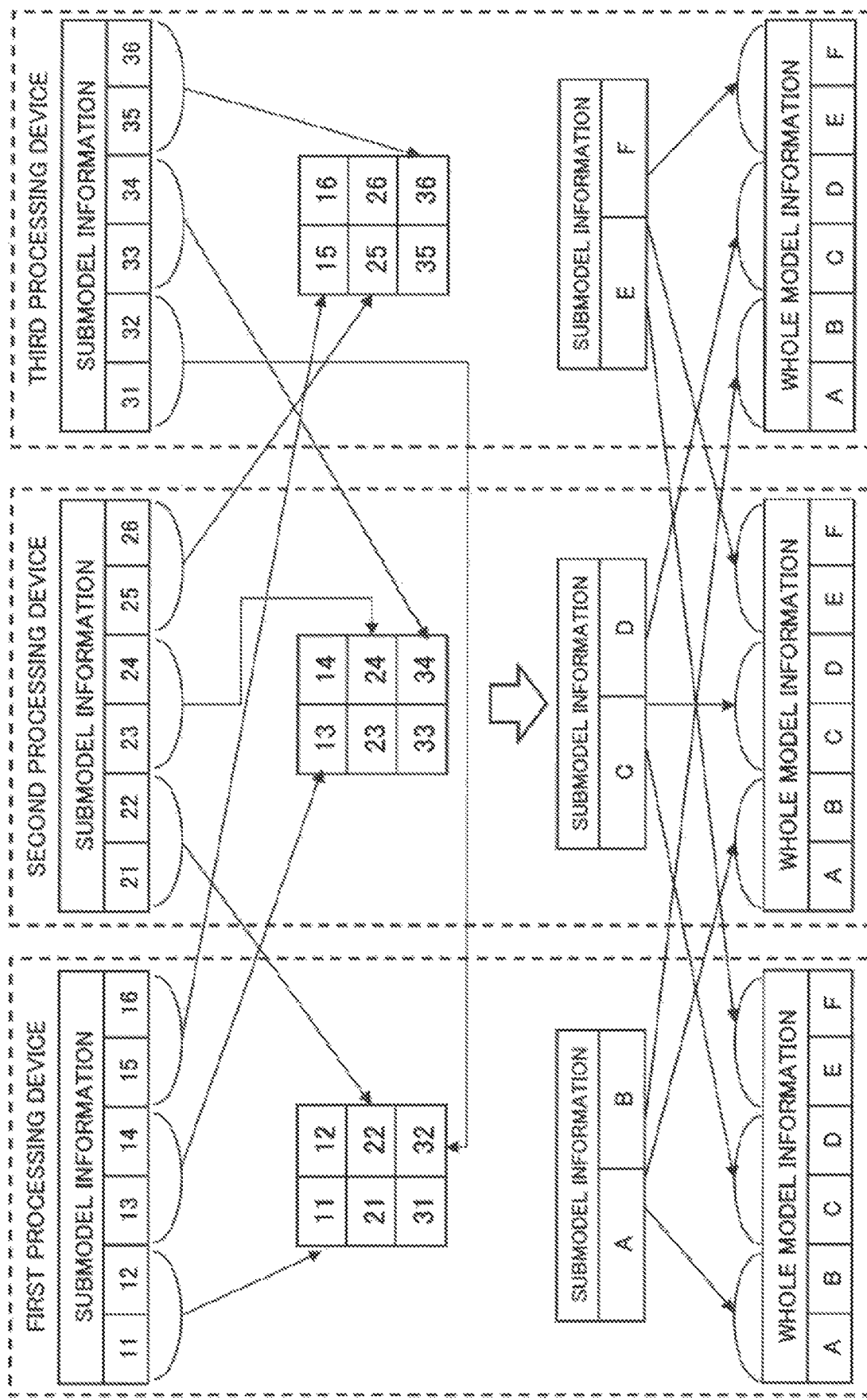
FIG. 18 is a diagram conceptually illustrating processing to be executed when whole model information is processed in parallel in each processing device.

Processing to be executed, when whole model information is processed in parallel in each processing device, will be described with reference to FIG. 18. FIG. 18 is a diagram conceptually illustrating processing to be executed when whole model information is processed in parallel in each processing device.

For convenience of explanation, it is assumed that whole model information includes six elements. It is assumed that processing of gathering first elements (elements 11, 21, and 31) and second elements (elements 12, 22, and 32) among whole model information is allocated to a first processing device. It is assumed that processing of gathering third elements (elements 13, 23, and 33) and fourth elements (elements 14, 24, and 34) among whole model information is allocated to a second processing device. In this case, it is assumed that processing of gathering fifth elements (elements 15, 25, and 35) and sixth elements (elements 16, 26, and 36) among whole model information is allocated to a third processing device. The first and third processing devices respectively transmit, to the second processing device, values of the third elements (elements 13 and 33) and values of the fourth elements (elements 14 and 34). The first and second processing devices respectively transmit, to the third processing device, values of the fifth elements (elements 15 and 25) and values of the sixth elements (elements 16 and 26). The second and third processing devices respectively transmit, to the first processing device, values of the first elements (elements 21 and 31) and values of the second elements (elements 22 and 32).

Each processing device executes processing of gathering submodel information regarding an element in a processing domain allocated to the processing device itself. Thereafter, each processing device transmits, to another processing device, a value of an element in a processing domain calculated by the processing device itself. By this processing, whole model information is stored in each processing device.

Processing of gathering submodel information into whole model information, and the like are processing similar to the above-described example embodiments. In the present example embodiment, detailed description of the processing will be omitted.

Figure 19:
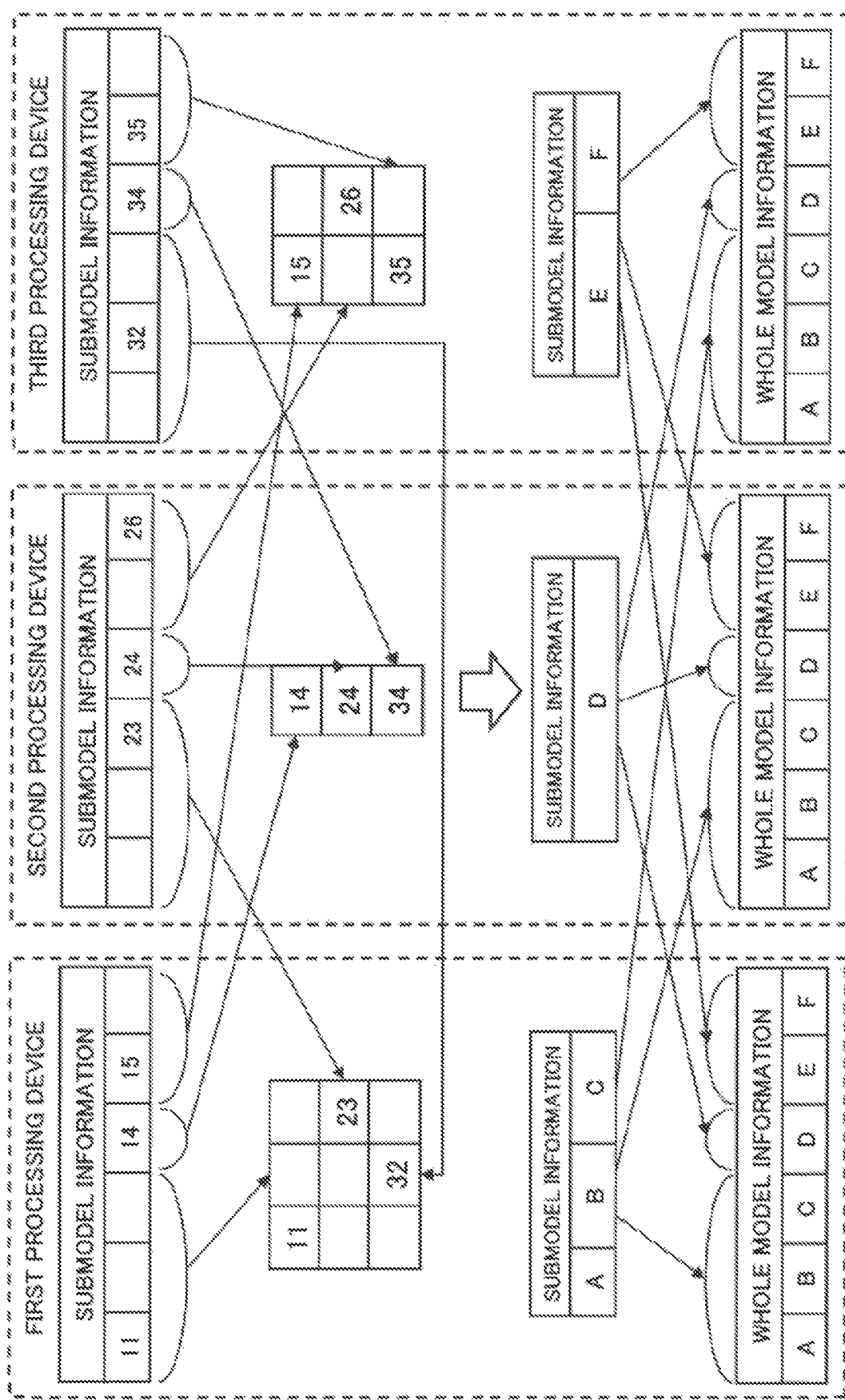
FIG. 19 is a diagram conceptually illustrating one example of processing of allocating gather processing to processing devices based on a number of processing devices.

Further, by balancing an amount of calculation (or an amount of communication) in gather processing allocated to each processing device among processing devices, it is possible to shorten a processing time in the information processing system 1601. Processing of balancing an amount of calculation (or an amount of communication) will be described with reference to FIG. 19. FIG. 19 is a diagram conceptually illustrating one example of processing of allocating gather processing to processing devices, based on a number of processing devices. For convenience of explanation, in the example illustrated in FIG. 19, an element taking zero value is illustrated. However, this does not mean that each processing device processes (or stores) the element taking zero value.

An amount of calculation (or an amount of communication) in gather processing changes depending on a number of elements being a calculation target in gather processing allocated to each processing device. As the number is larger, the amount of communication (or the amount of calculation) is larger. As the number is smaller, the amount of communication (or the amount of calculation) is smaller.

However, as described above, when gather processing is allocated to each processing device in accordance with an element identifier in whole model information, a number of non-zero elements among elements identified by element identifiers is not necessarily balanced. Therefore, when gather processing is allocated to each processing device based on an element identifier, an amount of calculation (or an amount of communication) may not be balanced regarding each processing device.

In view of the above, as exemplified in FIG. 19, it is possible to balance an amount of calculation among processing devices by allocating gather processing to each processing device based on a number of processing devices which execute processing for elements identified by element identifiers in whole model information instead of based on each identifier.

As exemplified in submodel information in an upper portion of FIG. 19, it is assumed that one each processing device is allocated respectively to each of elements (specifically, elements 11, 32, and 23) identified by first to third element identifiers, and an element (specifically, element 26) identified by a sixth element identifier. It is assumed that three processing devices are allocated to elements (specifically, elements 14, 24, and 34) identified by fourth element identifiers, and two processing devices are allocated to elements (specifically, elements 15 and 35) identified by fifth element identifiers.

In order to equally allocate gather processing to processing devices, for example, gather processing for elements identified by the first to third element identifiers is allocated to the first processing device, and gather processing for an element identified by the fourth element identifier is allocated to the second processing device. Further, gather processing for elements identified by the fifth to sixth element identifiers is allocated to the third processing device. By this allocation, a number of processing devices for processing the elements is balanced. Therefore, by determining allocation as described above, the information processing system 1601 balances an amount of calculation (or an amount of communication) regarding each processing device. One example of this allocation processing will be specifically described.

For example, the domain decomposition determination unit 1604 acquires a number of processing devices which process an element identified by an element identifier, for each element identifier in whole model information. In a case of submodel information illustrated in an upper portion of FIG. 19, numbers of processing devices allocated to elements identified by the first to sixth element identifiers are respectively one (element 11), one (element 32), one (element 23), three (elements 14, 24, and 34), two (elements 15 and 35), and one (element 26). The domain decomposition determination unit 1604 acquires the above-described numbers, based on conversion information generated by each processing device, for example. Next, the domain decomposition determination unit 1604 determines allocation in such a way that a number of non-zero elements per processing device is balanced. For example, the domain decomposition determination unit 1604 determines allocation in accordance with processing as will be described later.

For example, the domain decomposition determination unit 1604 calculates a cumulative value in order regarding a number of processing devices. In a case of the example illustrated in FIG. 19, the domain decomposition determination unit 1604 acquires 1, 2 (=1+1), 3 (2+1), 6 (=3+3), 8 (=6+2), and 9 (=8+1). A finally calculated cumulative value (e.g., 9) represents a cumulative value of a number of non-zero elements. The domain decomposition determination unit 1604 acquires a number of non-zero elements to be allocated to one processing device (specifically, an average value, e.g., 3 (=9÷3)) by dividing the finally calculated cumulative value by a number of processing devices (e.g., 3). The domain decomposition determination unit 1604 determines allocation in such a way as to attain a value approximate to the average value in the above-described order. Hereinafter, for convenience of explanation, calculated values "1, 2, 3, 6, 8, 9" are referred to as a number sequence.

The domain decomposition determination unit 1604 specifies an element taking a value approximate to the average value 3 in a number sequence, in accordance with a binary search method or the like, for example. In this case, since a third value from left in the number sequence is 3, the domain decomposition determination unit 1604 determines a domain to be allocated to the first processing device as first to third elements. Next, the domain decomposition determination unit 1604 calculates a value (6 (=3×2)), which is a base of determining allocation with respect to a second processing device, and determines that a fourth value from left in the number sequence is 6. The domain decomposition determination unit 1604 determines a domain to be allocated to the second processing device being a second processing device as a fourth element. Next, the domain decomposition determination unit 1604 calculates a value (9 (=3×3)), which is a base of determining allocation with respect to a third processing device, and determines that a sixth value from left in the number sequence is 9. The domain decomposition determination unit 1604 determines a domain to be allocated to the third processing device being a third processing device as fifth to sixth elements.

A procedure of calculating allocation is not limited to the above-described procedure.

Figure 17:
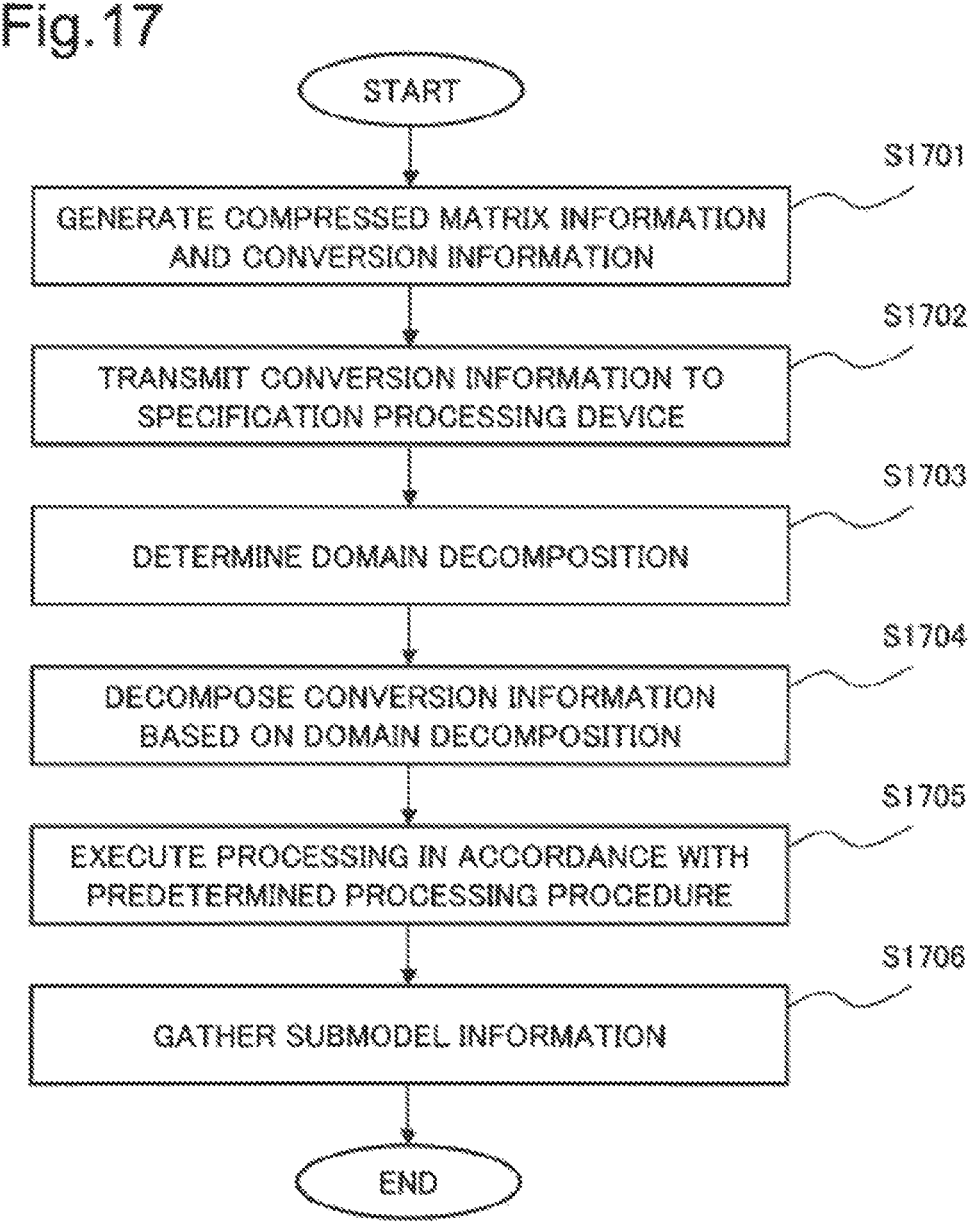
FIG. 17 is a flowchart illustrating a flow of processing in the information processing system.

Next, processing in the information processing system 1601 according to the third example embodiment of the present invention will be described with reference to FIG. 17. FIG. 17 is a flowchart illustrating a flow of processing in the information processing system 1601.

In each processing device, the matrix conversion unit 104 generates compressed matrix information (exemplified in FIG. 4), among submatrix information (exemplified in FIG. 4), storing a value of an element included in a non-zero column, and conversion information (exemplified in FIG. 4) representing a relationship among a column identifier identifying a column in the compressed matrix information and a column identifier identifying a column in the matrix information, (Step S1701).

In each processing device, the matrix conversion unit 104 transmits the generated conversion information (exemplified in FIG. 4) to a specification processing device having a function of determining a decomposed domain (Step S1702).

In the specification processing device, the domain decomposition determination unit 1604 determines a domain (specifically, a decomposed domain) to which processing is allocated, by executing processing as described with reference to FIG. 17, for example (Step S1703). Thereafter, the domain decomposition determination unit 1604 decomposes the conversion information into a piece of sub-conversion information for each processing device, based on the determined decomposed domain (Step S1704), and transmits the piece of sub-conversion information to each processing device.

Each processing device receives the sub-conversion information transmitted by the specification processing device, and executes processing in accordance with a predetermined processing procedure, with respect to the compressed matrix information and the submodel information, based on the received sub-conversion information (Step S1705). Each processing device generates submodel information based on the compressed matrix information, by executing processing in accordance with the predetermined processing procedure. Each processing device decomposes the generated submodel information, based on decomposed domain information (e.g., the decomposed domain 2007 in FIG. 20), and transmits the piece of decomposed submodel information to a processing device for executing processing for the submodel information. Processing of decomposing the submodel information is processing similar to processing of decomposing conversion information.

A processing device receives submodel information, generates submodel information by gathering the submodel information in accordance with distributed conversion information (Step S1706), and transmits the generated submodel information to each processing device.

Processing as described above is repeatedly executed in accordance with a method defined in a predetermined processing procedure, for example, until calculated submodel information converges, until a predetermined number of repetitions is reached, or the like.

Further, when processing is executed in terms of a mini-batch unit, processing similar to processing as described above is executed regarding conversion information generated in terms of a mini-batch unit.

Next, advantageous effects of the information processing system 1601 according to the third example embodiment of the present invention will be described.

The information processing system 1601 according to the third example embodiment can efficiently secure a memory area required for processing to matrix information in terms of a volume. A reason for this is that a memory area required for processing relating to compressed matrix information being a processing target is secured in terms of a volume depending on a number of columns for which processing is required, similarly to a reason described in the first example embodiment.

Further, the information processing system 1601 according to the third example embodiment can provide information capable of executing processing to matrix information with high parallel performance. A reason for this is that, by the processing as described with reference to FIG. 19, the information processing system 1601 equivalently (or substantially equivalently) allocates processing based on a predetermined processing procedure to processing devices. In other words, by classifying columns into a group having an equivalent (or substantially equivalent) number of pieces of conversion information including a column identifier, gather processing relating to a column included in the group is equivalent (or substantially equivalent). Consequently, for example, the information processing system 1601 allocates the group to one processing device and can achieve highly parallel processing of gather processing. Whether to be substantially equivalent can be determined, based on whether a variance value of an amount of processing per an average value of the amount of processing is equal to or less than a certain value (e.g., 0% to 8%).

Fourth Example Embodiment

Next, a fourth example embodiment according to the present invention will be described.

Figure 22:
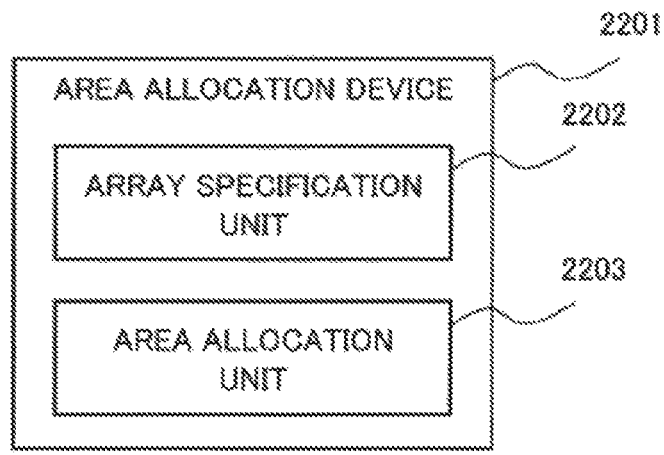
FIG. 22 is a block diagram illustrating a configuration of an area allocation device according to a fourth example embodiment of the present invention.

A configuration of an area allocation device 2201 according to the fourth example embodiment of the present invention will be described with reference to FIG. 22. FIG. 22 is a block diagram illustrating a configuration of the area allocation device 2201 according to the fourth example embodiment of the present invention.

The area allocation device 2201 according to the fourth example embodiment includes an array specification unit (array specifier) 2202 and an area allocation unit (area allocator) 2203. The area allocation device 2201 inputs subarray information being at least a part of array information. Subarray information may not be information relating to a value arranged at a consecutive row number among array information, but may be information relating to a value arranged at a discrete row number, for example.

Array information is matrix information exemplified in FIG. 3, for example. Subarray information is submatrix information exemplified in FIG. 4, for example. Specifically, in the present example embodiment, array information is two-dimensionally arranged information by a row and a column. Among array information, one of arrays representing a row or a column is referred to as a first array, and the other is referred to as a second array.

Figure 23:
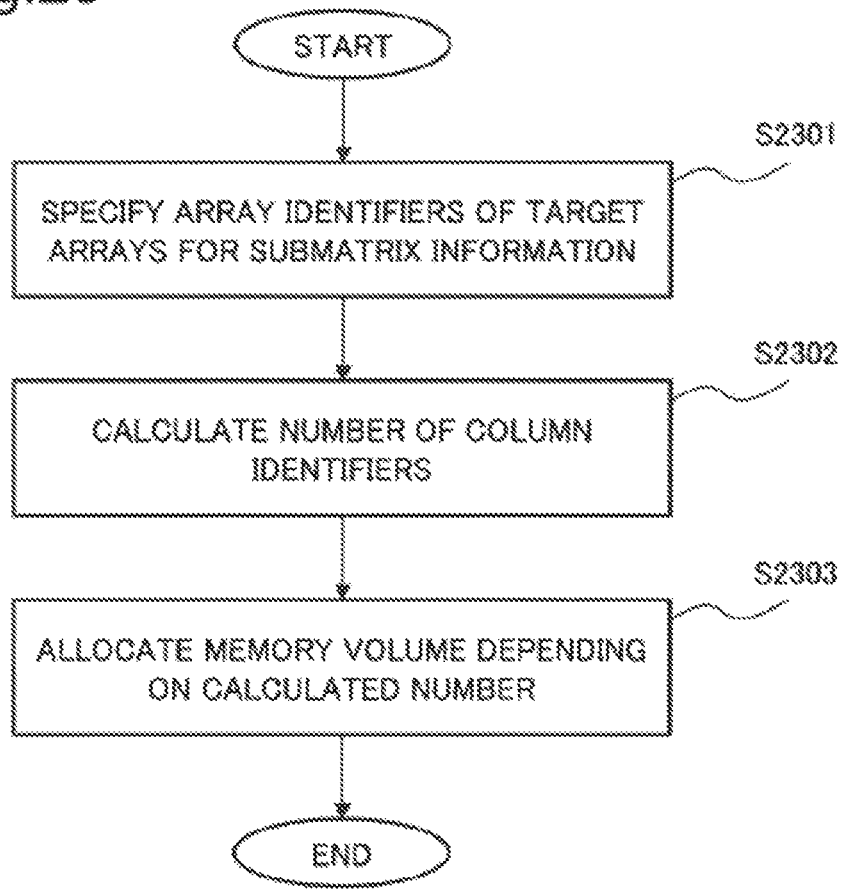
FIG. 23 is a flowchart illustrating a flow of processing in the area allocation device according to the fourth example embodiment.

Next, processing in the area allocation device 2201 according to the fourth example embodiment will be described with reference to FIG. 23. FIG. 23 is a flowchart illustrating a flow of processing in the area allocation device 2201 according to the fourth example embodiment.

First, the array specification unit 2202 specifies a target array in which at least one value is different from a predetermined value among values stored in elements arranged in a vertical direction, regarding input subarray information (e.g. submatrix information exemplified in FIG. 4), and further specifies an array identifier identifying the specified target array (Step S2301). For example, in a case of the example illustrated in FIG. 4, the array specification unit 2202 specifies that at least one value is different from a predetermined value among values stored in elements included in first, fourth, and sixth arrays in subarray information. Specifically, the array specification unit 2202 specifies that the first, fourth, and sixth arrays are specific arrays. Next, the array specification unit 2202 specifies, for example, "1", "4", and "6" as array identifiers identifying the first, fourth, and sixth arrays. An array identifier represents at least either one of a column identifier or a row identifier.

Next, the area allocation unit 2203 calculates a number of array identifiers specified by the array specification unit 2202 (Step S2302), and secures a memory area having a memory volume depending on the calculated number (Step S2303). For example, when the array specification unit 2202 specifies array identifiers "1", "4", and "6", the area allocation unit 2203 calculates "3" being a number of array identifiers, and secures a memory area (e.g., a memory area for storing three values) depending on the calculated number. In a memory area secured by the area allocation unit 2203, for example, submodel information (exemplified in FIG. 5 and the like) based on the subarray information is stored.

The array specification unit 2202 and the area allocation unit 2203 are implementable by a function similar to a function and the like included in the matrix conversion unit 104 (FIG. 1), the matrix conversion unit 1303 (FIG. 13), or the matrix conversion unit 2002 (FIG. 20). Specifically, the area allocation device 2201 is implementable by a function similar to a function and the like included in the information processing system 101 (FIG. 1), the information processing system 901 (FIG. 9), or the information processing system 1601 (FIG. 16).

Next, advantageous effects of the area allocation device 2201 according to the fourth example embodiment of the present invention will be described.

The area allocation device 2201 according to the fourth example embodiment, can efficiently secure a memory area required for processing relating to array information in terms of a memory volume. A reason for this is that a memory area required for processing relating to compressed array information being a processing target is secured in terms of a volume depending on a number of arrays for which processing is required. An array for which processing is required is an array in which at least one value is different from a predetermined value, among values stored in elements arranged in a vertical (column) direction in the compressed array information. Consequently, an information processing system is able to efficiently execute processing in accordance with a predetermined processing procedure, by storing submodel information and the like in a memory area secured by the area allocation device 2201.

Hardware Configuration Example

A configuration example of hardware resources that achieve an information processing system according to first to third example embodiments of the present invention or an area allocation device according to a fourth example embodiment will be described. However, the area allocation device may be achieved using physically or functionally at least two calculation processing devices. Further, the area allocation device may be achieved as a dedicated device.

Figure 24:
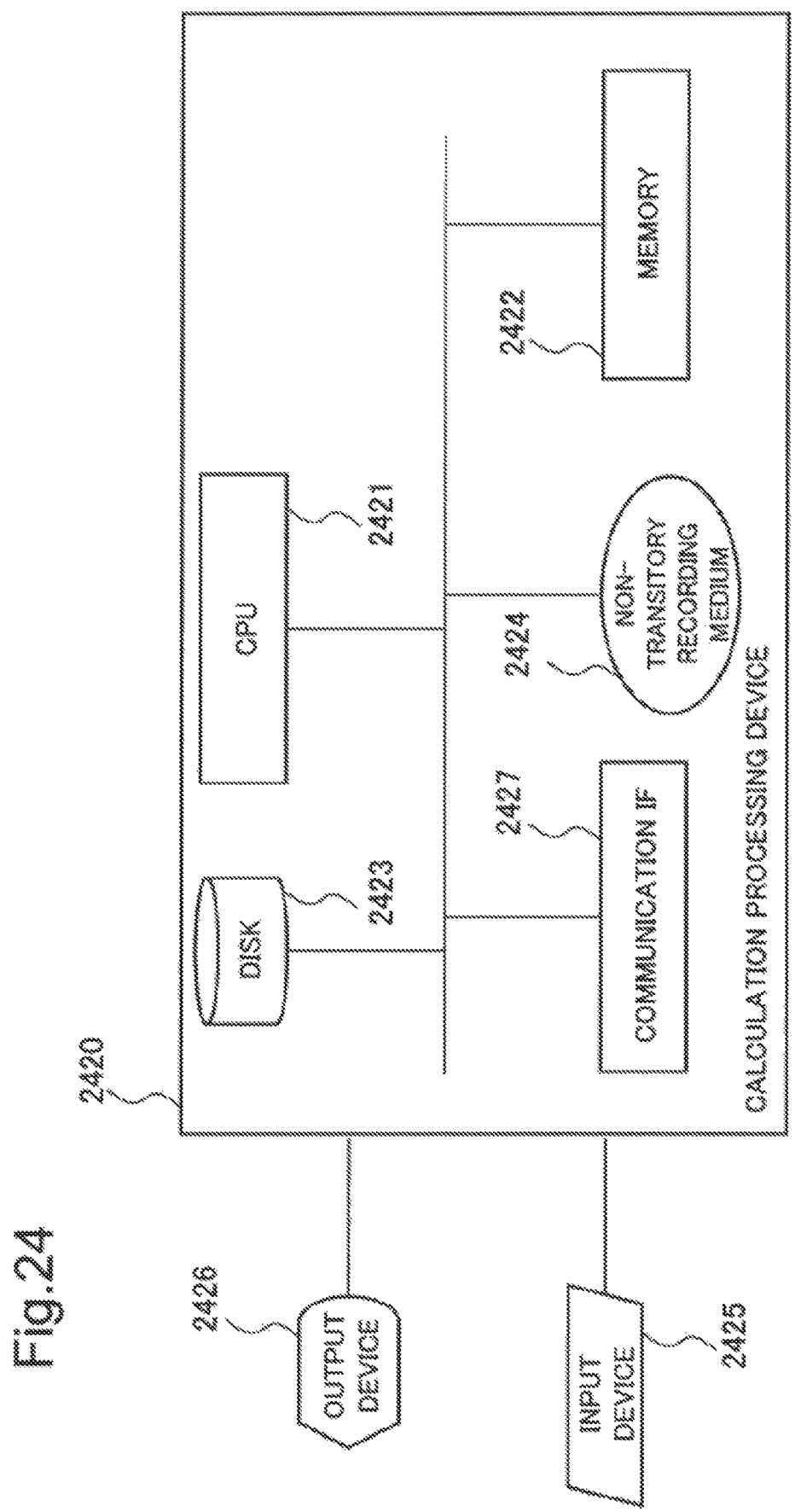
FIG. 24 is a block diagram schematically illustrating a hardware configuration of a calculation processing device capable of achieving an information processing system according to the first to third example embodiments or the an allocation device according to the fourth example embodiments of the present invention.

FIG. 24 is a block diagram schematically illustrating a hardware configuration of a calculation processing device capable of achieving the information processing system according to the first to third example embodiments or the area allocation device according to the fourth example embodiments of the present invention. A calculation processing device 2420 includes a central processing unit (CPU) 2421, a memory 2422, a disk 2423, a non-transitory recording medium 2424, and a communication interface (hereinafter, refer to "communication I/F") 2427. The calculation processing device 2420 may connect an input device 2425 and an output device 2426. The calculation processing device 2420 can execute transmission/reception of information to/from another calculation processing device and a communication device via the communication I/F 2427.

The non-transitory recording medium 2424 is, for example, a computer-readable Compact Disc, Digital Versatile Disc. The non-transitory recording medium 2424 may be Universal Serial Bus (USB) memory, Solid State Drive or the like. The non-transitory recording medium 2424 allows a related program to be holdable and portable without power supply. The non-transitory recording medium 2424 is not limited to the above-described media. Further, a related program can be carried via a communication network by way of the communication I/F 2427 instead of the non-transitory recording medium 2424.

In other words, the CPU 2421 copies, on the memory 2422, a software program (a computer program: hereinafter, referred to simply as a "program") stored in the disk 2423 when executing the program and executes arithmetic processing. The CPU 2421 reads data necessary for program execution from the memory 2422. When display is needed, the CPU 2421 displays an output result on the output device 2426. When a program is input from the outside, the CPU 2421 reads the program from the input device 2425. The CPU 2421 interprets and executes an information processing program (FIG. 2, FIG. 10, or FIG. 17) or an area allocation program (FIG. 23) present on the memory 2422 corresponding to a function (processing) indicated by each unit illustrated in FIG. 1, FIG. 9, FIG. 16, or FIG. 22 described above. The CPU 2421 sequentially executes the processing described in each example embodiment of the present invention.

In other words, in such a case, it is conceivable that the present invention can also be made using the area allocation program. Further, it is conceivable that the present invention can also be made using a computer-readable, non-transitory recording medium storing the program.

The present invention has been described using the above-described example embodiments as example cases. However, the present invention is not limited to the above-described example embodiments. In other words, the present invention is applicable with various aspects that can be understood by those skilled in the art without departing from the scope of the present invention.

This application is based upon and claims the benefit of priority from Japanese patent application No. 2016-199710, filed on Oct. 11, 2016, the disclosure of which is incorporated herein in its entirety.

REFERENCE SIGNS LIST 101 information processing system
102 worker processing device
103 master processing device
104 matrix conversion unit
105 processing unit
106 gather unit
107 model conversion unit
901 information processing system
902 master processing device
903 tree structure generation unit
904 conversion information merge unit
1301 specification processing device
1303 matrix conversion unit
1304 conversion information
1305 parent processing device
1309 processing unit
1310 submodel information
1311 conversion information
1312 tree structure generation unit
1313 tree structure
1314 processing device
1315 information processing system
1401 conversion information
1402 conversion information
1403 conversion information
1404 submodel information
1405 conversion information
1406 submodel information
1407 conversion information merge unit
1408 gather unit
1409 conversion information
1410 parent processing device
1411 submodel information
1501 conversion information
1502 submodel information
1503 conversion information
1504 model conversion unit
1505 child processing device
1506 submodel information
1507 submodel information
1601 information processing system
1602 master processing device
1603 model information decomposition unit
1604 domain decomposition determination unit
1605 conversion information decomposition unit
2002 matrix conversion unit
2003 conversion information
2004 conversion information decomposition unit
2005 specification processing device
2006 decomposed conversion information
2007 decomposed domain
2010 processing unit
2011 submodel information
2012 processing result decomposition unit
2013 submodel information
2014 processing device
2015 conversion information
2016 domain decomposition determination unit
2017 decomposed domain
2101 processing device
2102 decomposed conversion information
2103 model conversion unit
2104 processing device
2105 decomposed submodel information
2106 gather unit
2107 processing device
2201 area allocation device
2202 array specification unit
2203 area allocation unit 2420 calculation processing device
2421 CPU
2422 memory
2423 disk
2424 non-transitory recording medium
2425 input device
2426 output device
2427 communication IF

The invention claimed is:

1. An information processing system comprising:
a master processing device implemented by a first processor; and
a worker processing device implement by a second processor, wherein
the second processor of the worker processing device is configured to:
specify, for each submatrix of a plurality of submatrices of a matrix along a row direction of the matrix, column identifiers that each represent a column storing an element having a value that is non-zero;
calculate, for each submatrix, a number of the column identifiers specified for the submatrix;
allocate, for each submatrix, a memory area having a memory volume depending on the number of the column identifiers calculated for the submatrix;
generate, for each submatrix, compressed matrix information for the submatrix having matrix columns identified by the column identifiers specified for the submatrix;
generate, for each submatrix, first submodel information for the submatrix using machine learning based on the compressed matrix information for the submatrix; and
transmit, for each submatrix, the generated first submodel information for the submatrix and conversion information for the submatrix to the master processing device, wherein
the first processor of the master processing device is configured to:
generate, for each submatrix, whole model information for matrix information for the submatrix based on the first submodel information for the submatrix transmitted by the worker processing device;
generate, for each submatrix, second submodel information for the submatrix from the generated whole model information for the submatrix and the conversion information for the submatrix transmitted by the worker processing device; and
transmit, for each submatrix, the generated second submodel information to the worker processing device,
wherein, for each submatrix, the memory volume of the memory area is allocated sufficient to store only the compressed matrix information for the submatrix as to only columns of the submatrix having non-zero values and therefore is smaller than if the memory volume were allocated to store the matrix information for the submatrix as to both the columns having non-zero values and columns of the submatrix having zero values, such that a cache hit rate improves when processing the first submodel information and the second submodel information due to an increased likelihood that the memory volume is cached.

2. The information processing system according to claim 1, wherein
the second processor is configured to further:
allocate a processing device that executes processing for each of the submatrices to each of the submatrices.

3. The information processing system according to claim 1, wherein
the second processor is configured to further:
generate conversion information associating a first column identifier for a first column storing a first value in each of the submatrices with a second column identifier for a second column of the compressed matrix information for the submatrix.

4. The information processing system according to claim 1, wherein
the second processor is configured to further:
specify column identifiers for mini-batch including the portion of the rows of each of the submatrices, and
calculate a number of the column identifiers for the mini-batch and allocate the memory area having the memory volume depending on the calculated number.

5. The information processing system according to claim 2, wherein
the second processor is configured to further:
allocate gathering processing for elements in each of the submatrices to a certain processing device.

6. The information processing system according to claim 3, wherein
the second processor is configured to further:
calculate, based on the conversion information, a second number of elements of the generated compressed matrix and determine a communication order in gathering processing for the elements in each of the submatrices, the communication order being an order of the calculated second number of the elements, communication of the communication order being transmitted from a first processing device that executes processing for the compressed matrix matrix in a case in which the calculated second number of the elements is smaller to a second processing device that executes processing for the compressed matrix information in a case in which the calculated second number of the elements is larger.

7. The information processing system according to claim 3, wherein
the second processor is configured to further:
calculate a third number of elements with having the first value in submodel information, classify each column into one of a plurality of groups, and determine the processing device that gathers elements in each of the submatrices for each of the groups, the groups having an equivalent sum of the calculated third number, the submodel information being generated based on the compressed matrix information.

8. An information processing method, performed by an information processing system including a master processing device implemented by a first processor and a worker processing device implemented by a second processor, the method comprising:
by the second processor of the worker processing device executing the second instructions:
specifying, for each submatrix of a plurality of submatrices of a matrix along a row direction of the matrix, column identifiers that each represent a column storing an element having a value that is non-zero;
calculating, for each submatrix, a number of the specified column identifiers specified for the submatrix;
allocating, for each submatrix, a memory area having a memory volume depending on the number of the column identifiers calculated for the submatrix;

generating, for each submatrix, compressed matrix information for the submatrix having matrix columns identified by the column identifiers specified for the submatrix;
generating, for each submatrix, first submodel information for the submatrix using machine learning based on the compressed matrix information for the submatrix; and
transmitting, for each submatrix, the generated first submodel information for the submatrix and conversion information for the submatrix to the master processing device,
by the first processor of the master processing device execution the first instructions:
generating, for each submatrix, whole model information for matrix information for the submatrix based on the first submodel information for eaeh the submatrix transmitted by the worker processing device;
generating, for each submatrix, second submodel information for the submatrix from the generated whole model information for the submatrix and the conversion information for the submatrix transmitted by the worker processing device; and
transmitting, for each submatrix, the generated second submodel information to the worker processing device,
wherein, for each submatrix, the memory volume of the memory area is allocated sufficient to store only the compressed matrix information for the submatrix as to only columns of the submatrix having non-zero values and therefore is smaller than if the memory volume were allocated to store the matrix information for the submatrix as to both the columns having non-zero values and columns of the submatrix having zero values, such that a cache hit rate improves when processing the first submodel information and the second submodel information due to an increased likelihood that the memory volume is cached.

9. A non-transitory recording medium storing an information processing program executable by an information processing system including a master processing device implemented a first processor and a worker processing device implemented by a second processor to perform a method comprising:
by the second processor of the worker processing device executing the second instructions:
specifying, for each submatrix of a plurality of submatrices of a matrix along a row direction of the matrix, column identifiers that each represent a column storing an element having a value that is non-zero;
calculating, for each submatrix, a number of the column identifiers specified for the submatrix;
allocating, for each submatrix, a memory area having a memory volume depending on the number of the column identifiers calculated for the submatrix;
generating, for each submatrix, compressed matrix information for the submatrix having matrix columns identified by the column identifiers specified for the submatrix;
generating, for each submatrix, first submodel information for the submatrix using machine learning based on the compressed matrix information for the submatrix; and
transmitting, for each submatrix, the generated first submodel information for the submatrix and conversion information for the submatrix to the master processing device,
by the first processor of the master processing device execution the first instructions:
generating, for each submatrix, whole model information for matrix information for the submatrix based on the first submodel information for the submatrix transmitted by the worker processing device;
generating, for each submatrix, second submodel information for the submatrix from the generated whole model information for the submatrix and the conversion information for the submatrix transmitted by the worker processing device; and
transmitting, for each submatrix, the generated second submodel information to the worker processing device,
wherein, for each submatrix, the memory volume of the memory area is allocated sufficient to store only the compressed matrix information for the submatrix as to only columns of the submatrix having non-zero values and therefore is smaller than if the memory volume were allocated to store the matrix information for the submatrix as to both the columns having non-zero values and columns of the submatrix having zero values, such that a cache hit rate improves when processing the first submodel information and the second submodel information due to an increased likelihood that the memory volume is cached.

* * * * *